United States Patent [19]

Cimral et al.

[11] Patent Number: 5,241,645
[45] Date of Patent: Aug. 31, 1993

[54] COMPUTER SYSTEM FOR CREATING AND MANIPULATING SUBSETS OF DYNAMIC INFORMATION SYSTEMS MODELS

[75] Inventors: John J. Cimral, Framingham; David A. Krieger, Cambridge; Igor Abramovich, all of Mass.

[73] Assignee: Bachman Information Systems, Inc., Burlington, Mass.

[21] Appl. No.: 516,815

[22] Filed: Apr. 27, 1990

[51] Int. Cl.⁵ .......................................... G06F 15/31
[52] U.S. Cl. ................................... 395/500; 395/600; 364/DIG. 2; 364/974.1; 364/974.5; 364/578
[58] Field of Search ... 364/200 MS File, 900 MS File, 364/578; 395/156, 160

[56] References Cited

U.S. PATENT DOCUMENTS

| | | | |
|---|---|---|---|
| 4,631,664 | 12/1986 | Bachman | 364/200 |
| 4,815,029 | 3/1989 | Barker et al. | 364/900 |
| 4,894,771 | 1/1990 | Kunii et al. | 364/200 |
| 4,956,773 | 9/1990 | Saito et al. | 364/200 |
| 5,008,810 | 4/1991 | Kessel et al. | 395/156 |
| 5,019,961 | 5/1991 | Addesso et al. | 364/192 |

OTHER PUBLICATIONS

James Martin, "*Data-Base Organization*", 2nd Ed., chapter 3, pp. 22-30, (1977).
Chris Gane, "*Computer-Aided Software Engineering: The Methodologies, the Products, the Future*", Rapid System Development Inc., (1988), pp. i thru 9-12, BAC-1, BAC-2, IEW-1, IEW-2, EXL-1.1 thru EXL-10.1.
Carma McClure, "The Case for Structured Development", PC Tech Journal, Aug. 1988, pp. 51-67.
Andrew Topper, "Building up to IEW/WS", PC Tech Journal, Sep. 1988, pp. 110-123.
Pose Overview, POSE, Picture Oriented Software Engineering Computer System Advisers, Inc., 1990.
Susan Janus, "POSE Explores the Case Frontier", PC Week Journal, V6 N22 Jun. 5, 1989 p. 89(2).

*Primary Examiner*—Robert B. Harrell
*Assistant Examiner*—Mehmet Geckil
*Attorney, Agent, or Firm*—Lahive & Cockfield

[57] ABSTRACT

A computer sytem for creating and manipulating subsets of dynamic information systems models of organizations. Generally, the system includes a plurality of dynamicallly linked modelers. The system includes a filter for creating a subset of a model. Each model subset is defined by operator-determined selection criteria. The subset is created by applying the selection criteria to the design data set of the model to be filtered. The resulting model subset may be displayed in a graphical representation. Such representations may enable the user to dynamically interact with the system.

20 Claims, 37 Drawing Sheets

*FIG.1A*

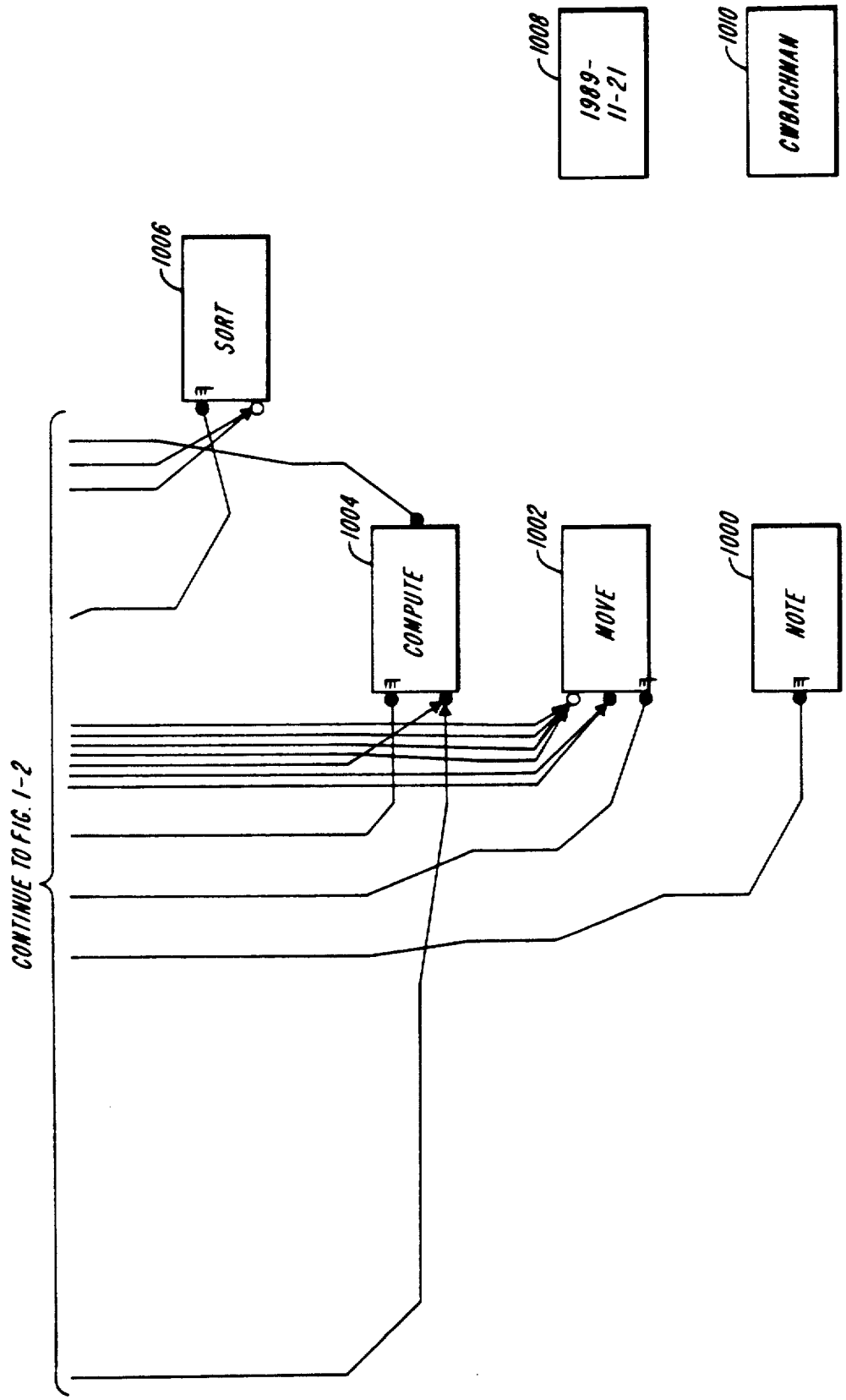

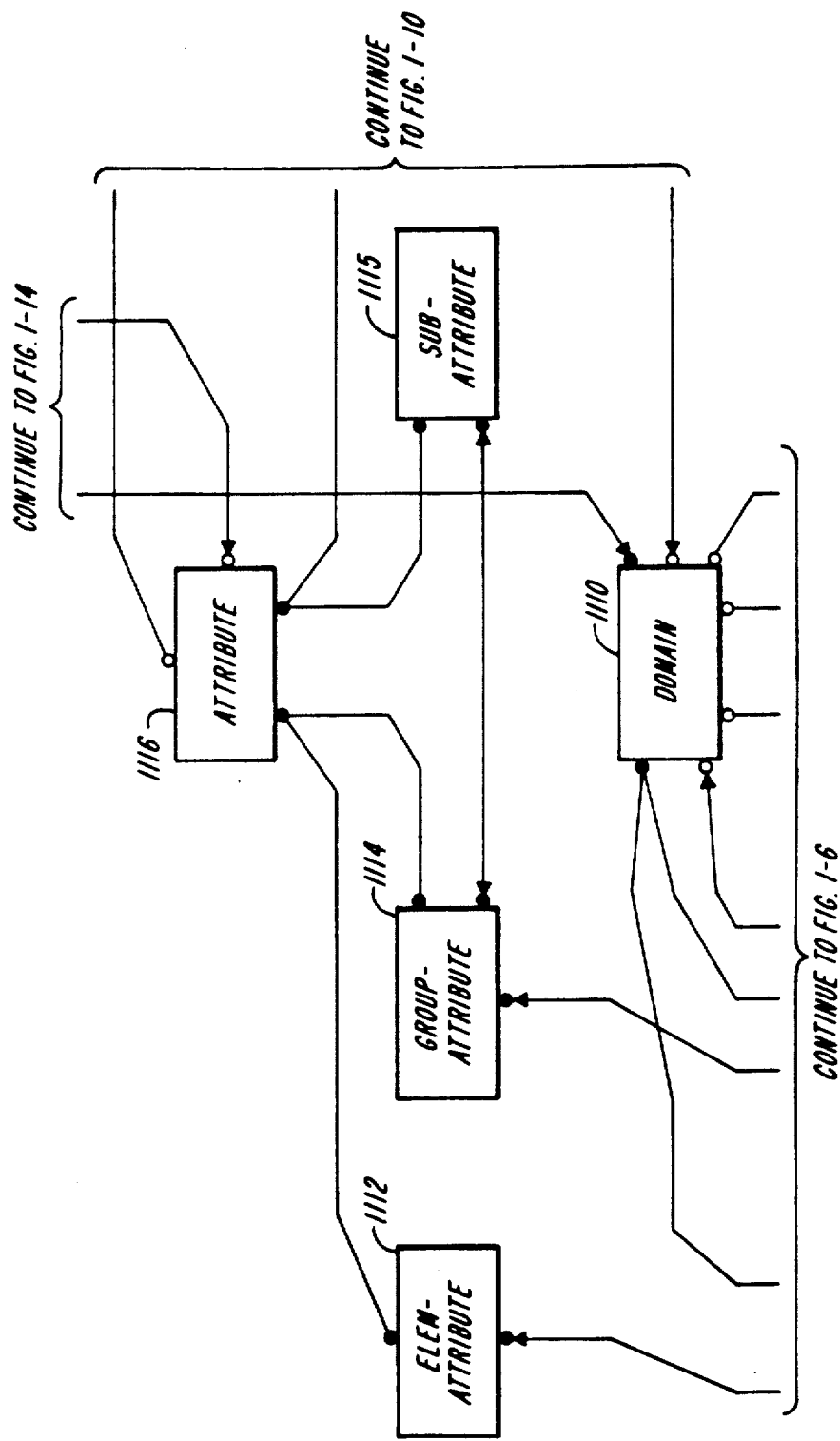

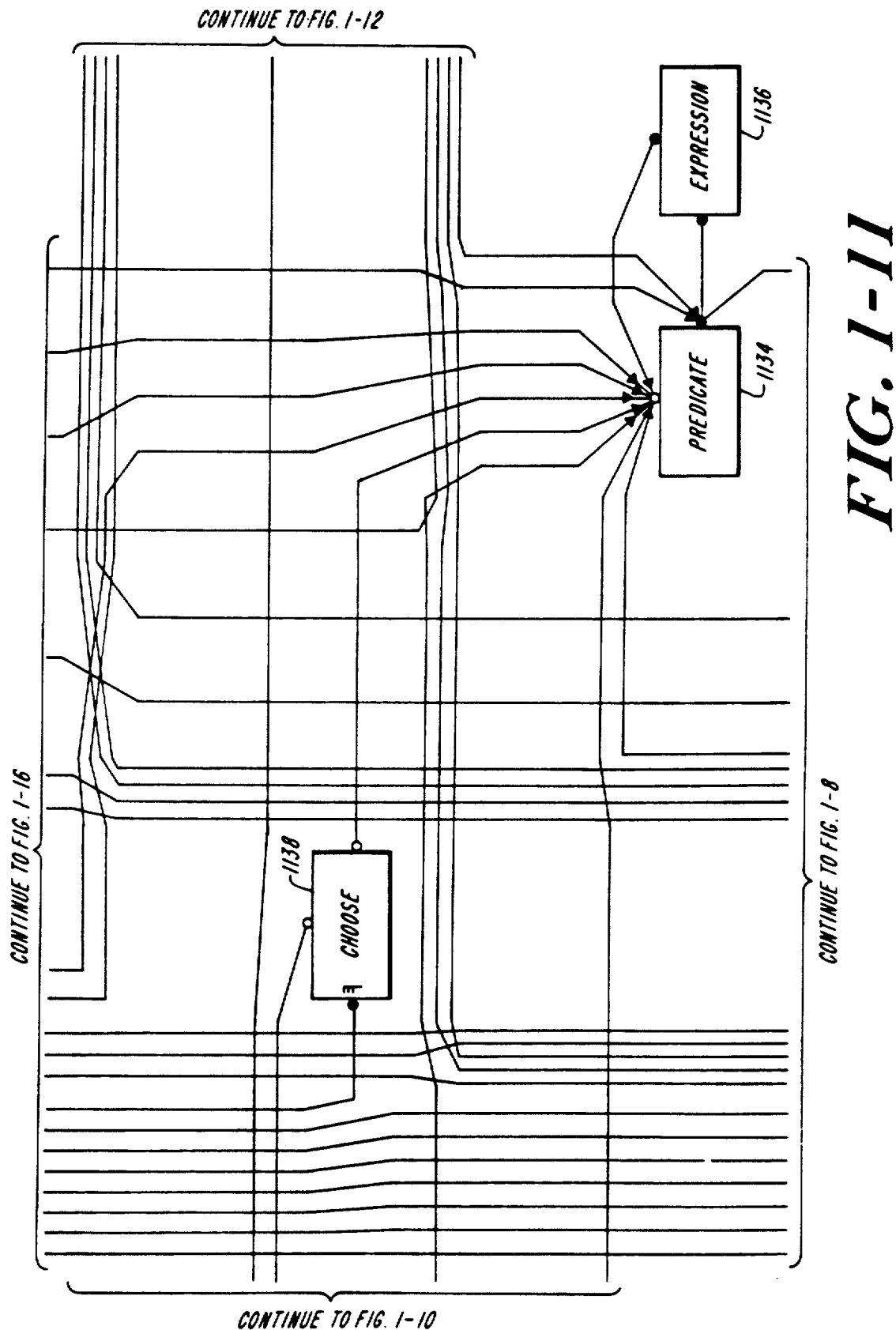

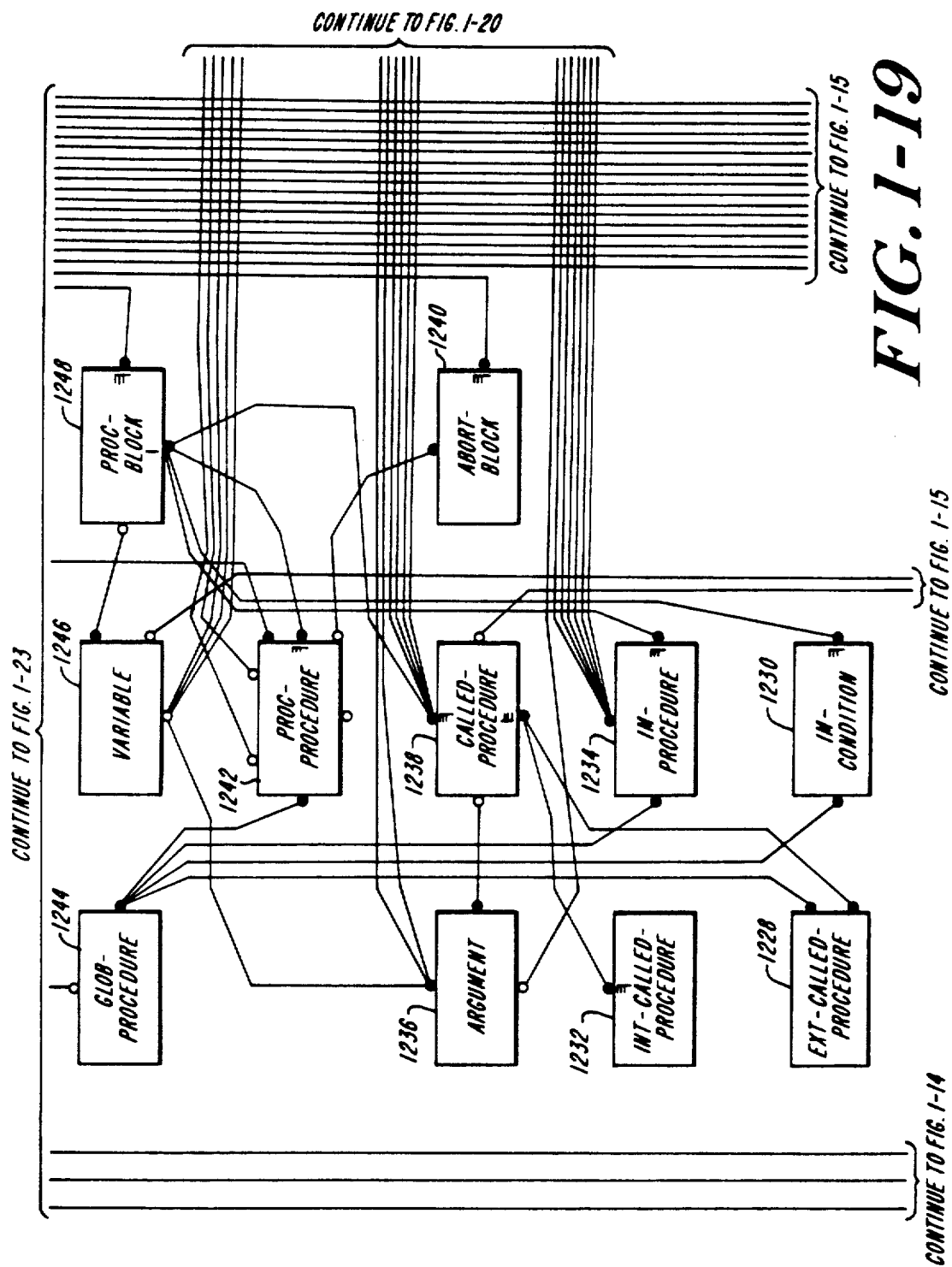

FIG. 1-20

COMPUTER SYSTEM FOR CREATING AND MANIPULATING SUBSETS OF DYNAMIC INFORMATION SYSTEMS MODELS

REFERENCE TO RELATED APPLICATIONS

The subject matter of this application is related to the subject matter of U.S. Pat. No. 5,146,591 entitled "Dynamic Information Management Computer System". That of U.S. Patent, is herein incorporated by reference.

BACKGROUND

This invention is directed to a computer system for creating and manipulating subsets of dynamic information system models of organizations, or an improved filter system for models of complex business transactions.

Early computer information processing systems stored, retrieved, and modified data contained in files specifically created for each information processing application. Knowledge relating to the structure and content of each data file was coded directly into each application program. When a need later developed to use the data within the data file for additional purposes, the user often created other primarily redundant data files, writing a specific application program to interact with each of these files. Subsequent changes in the content of any data file frequently mandated modification of related data files. If the user wished to avoid creating redundant data files, those modifications necessitated by additional demands were made to the original data file. Again, application programs were written to perform new tasks on the modified file.

However, the data file modifications sometimes hampered operation of earlier application programs, thus requiring their modification. As a consequence, computer installations involved in data processing faced the recurrent task of choosing between data file redundancy and repeated software modifications.

With the advent of so-called data base management systems, many of the problems encountered in the early information processing systems were alleviated. In addition to removing the need for the application program to address the intricacies of data file manipulation, data base management systems promoted efficient design, enhanced file maintenance and modification, eliminated data file redundancy, and provided substantial documentation regarding data file structure.

With the shift to data base management systems, the concept of dual data representation fully emerged. The first level of data representation, the physical representation, relates to the manner in which individual data records are stored and how their inter-relationships are depicted. The second level of data representation, the logical representation, describes the data base users' view of the data. The physical representation of the data is generally of no concern to the data base user. Rather, the task of manipulating individual data storage areas is left to the data base management system. Of concern to the data base user, however, is the logical representation of the data, since the users' ability to store, retrieve, and modify aggregations of data items, data records, and data relationships is dependent upon the form in which the data base management system presents data to the user.

Information management systems handle complex environments often consisting of hundreds of elements and relationships, permitting users to manipulate and employ data in ways not always anticipated by systems designers. Representation of such elements and relationships to a user presents a unique set of problems not encountered, and certainly not resolved by present data base management systems. Instead of being organized into application-oriented files, which are always addressed in the same way, as in data base systems, the information is organized so that it can be addressed in a variety of different ways, and can be used to answer a diversity of queries. All the interesting facts about entities are stored together rather than merely those facts needed for one application. As pointed out by J. Martin, "Computer Data-Base Organization", 2d ed., chapter 3, pp. 24-25 (1977), this "reservoir" concept of information systems is much easier to conceive than to implement. It is a complex and lengthy operation to build up such data bases, and it is expensive to search sufficiently quickly to give real-time answers to unanticipated queries.

The use of diagrams and windows is one way to depict the intricate relationships among entities, attributes, and other data elements in a complex information model. A variety of "windows" have been used in application programs to facilitate user interaction with a computer system. Windows have been used to show a user a "menu" of selection of operations which may be performed. Windows have also been used for displaying error messages. However, windows are not anticipatory, i.e. are not able to provide a tailored selection of options available to a user at a particular point in time or text.

The management of information has evolved into the field of Computer Aided Systems Engineering (CASE). As described by C. Gane, "Computer-Aided Software Engineering: The Methodologies, the Products, the Future" (1988), some of the common characteristics among CASE products are that they internally build a design database "at a higher level than code statements or physical data element definitions," and that they "typically hold[s] information about the data to be stored in the system, the business logic of the processes to be implemented, their physical layout of screens and reports, and other requirements/design information."

There are several such CASE products presently available. Two such products are EXCELERATOR, from Index Technology, Cambridge, Mass., and IEW, from Knowledgeware, Inc., Atlanta, Ga. EXCELERATOR enables an operator to work with data flow diagrams and data model diagrams, structure diagrams. An operator may also modify, delete, copy, rename, list or add a diagram. Diagram objects may be user defined, and are stored in a dictionary.

In a similar manner, IEW enables a user to work with, and create or change objects on diagrams, which affects an encyclopedia but not existing displays or screens. In addition, IEW can model relationships, entities and attributes together, or entities alone, but does not model attributes alone. It is often useful to manipulate attributes independent of entities to which they may later be tied.

Since one of the attractions of CASE for managing information systems is the availability of graphical tools for analysis, it would be important for a user to be able to graphically work in "real-time", i.e. the ability to make changes to diagram objects, and see a corresponding change to corresponding diagrams on existing screens. Such dynamic linking of objects and diagrams would then become an important aspect of an effective information management system utilizing CASE technology.

In conjunction with graphical tools for analysis, a user may desire to work with only a portion or subset of an entire complex model. A user may want to test objects on a subset of a model before integrating such objects into the entire model, while still retaining the ability to work with the subset in real-time. Existing systems are not believed to provide a dynamic subset of a model which may be user manipulated.

Accordingly, it is an object of the present invention to provide an improved filter system for enabling a user to manipulate a subset of objects of an information management model.

Other objects, features, and advantages of the invention will be apparent from the following description of the preferred embodiment thereof, and from the claims.

SUMMARY

Briefly, the present invention is a computer system for dynamically modeling information systems of organizations. The system includes a plurality of editors, or modelers, which enable a user to interact with the system. The modelers of the system are dynamically linked such that a change to any of the design data of one of the modelers affects a substantially immediate corresponding change to design data of another modeler.

The system includes filters for creating subsets of a model. Each model subset is defined by operator-determined selection criteria. The subset is created by applying the selection criteria to the design data set of the model to be filtered. The resulting model subset may be displayed in a graphical representation. Such representations may enable the user to dynamically interact with the system.

The system may include at least one information modeler, which provides a dynamic environment for the user to create, analyze, and modify IM models, which contain IM design data. The information Model (IM) design data may be representative of entities, attributes, relationships, entity methods, partnership sets, and combinations thereof, each of which may be effected by externally applied signals.

The system may also include at least one process modeler, providing a dynamic environment for the user to create, analyze, and modify information Flow Model (IFM) models containing IFM design data. The IFM design data is representative of processes, information stores, information flows, messages, sources and/or destinations. In general, the IFM design data, specifically information flow contents, correspond to IM design data. The IFM modeler and the IM modeler can be dynamically linked, such that a change in one design data set will affect a corresponding change in the other design data set.

The system may also include a logic modeler, which provides a dynamic environment for the user to create, analyze, and modify logical operations to be performed on the IM design data and the IFM design data. The logic modeler displays the system in text, tree diagram, or other graphical representations. The resulting display may be dynamic, enabling the user to affect IM and IFM design data, as well as the operations to be Performed on that design data.

The system can also include a function modeler, which enables a user to generate a function decomposition diagram, displaying the processes of IFM design data and any related subprocesses. The subprocesses may be displayed in a hierarchical fashion, and the user may dynamically manipulate the objects contained within the decomposition diagram.

Representation of the system may be in the form of a node and pin notation, where nodes define text fields which contain statements and design data. Attached to the nodes may be pins, which identify locations where modifications may be specified for the operation associated with a particular node.

BRIEF DESCRIPTION OF THE DRAWINGS

FIGS. 1—1 through 1—24 collectively show a detailed entity-relationship diagram of the embodiment of FIG. 1.

FIG. 1A shows a diagram designating the relative position of each of FIGS. 1—1 through 1-24.

FIG. 2 is a diagrammatic representation of display windows and facilities of the invention of FIG. 1.

FIG. 3 is a diagrammatic representation of an Entity-Relationship (E-R) diagram display which may be generated through an IM modeler of the invention of FIG. 1.

FIG. 5 is a diagrammatic representation of an IFM diagram display of the invention of FIG. 1.

FIG. 7 is a diagrammatic representation of an functional Decomposition (FD) diagram display of the invention of FIG. 1.

FIG. 8 is a diagrammatic representation of a Process Description Language (PDL) diagram display of the invention of FIG. 1.

FIG. 9 is a diagrammatic representation of a PDL diagram displayed in a diagram window of the invention of FIG. 1.

FIG. 10 is a diagrammatic representation of an options window of the invention of FIG. 1.

Like reference characters in the respective drawn figures indicate corresponding parts.

DESCRIPTION OF THE PREFERRED EMBODIMENT

Figure 1:
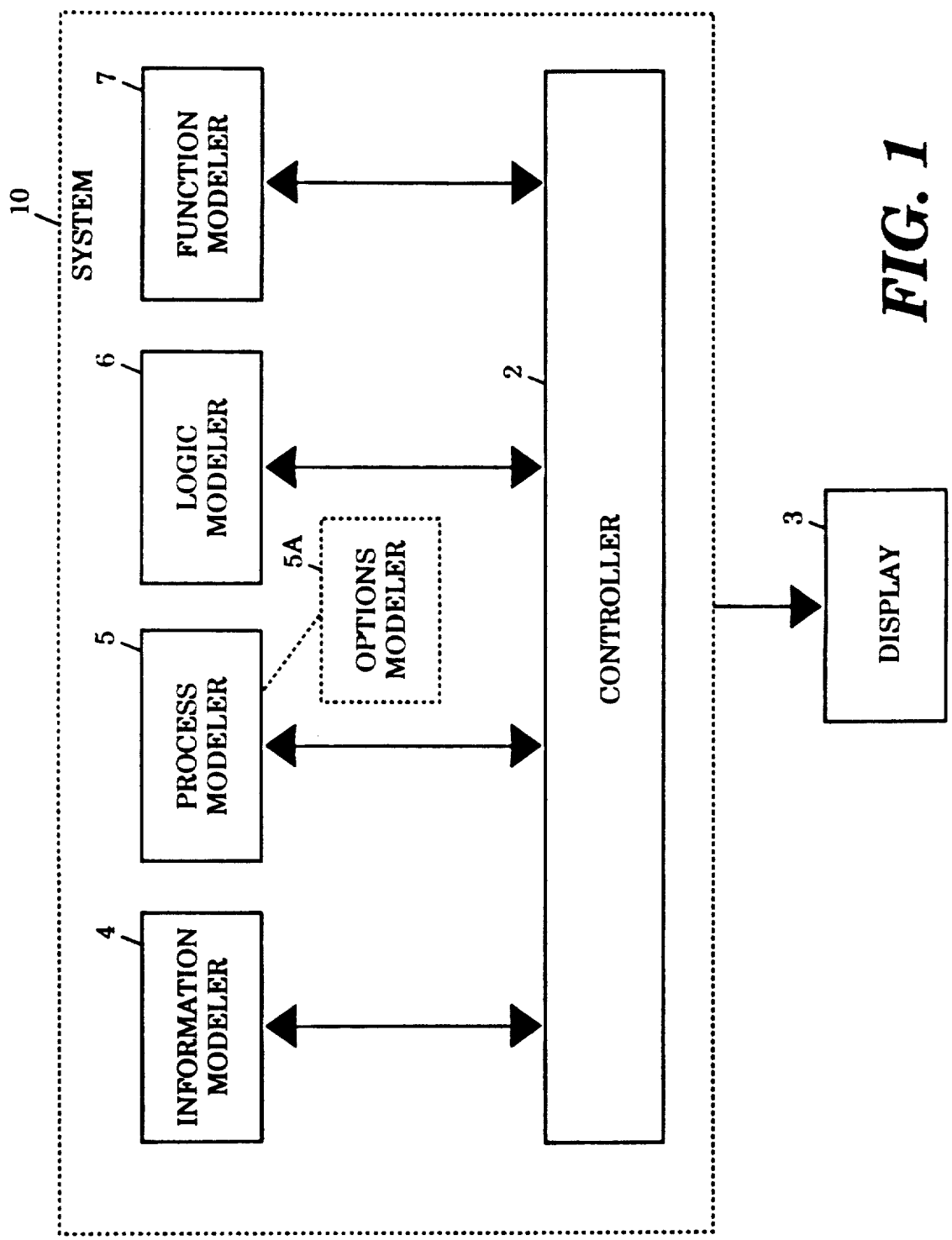
FIG. 1 is a flow diagram of an embodiment of the invention.

In the preferred embodiment of the invention disclosed herein, a system 10 operates using a programmed IBM-compatible 80386 personal computer, having an OS/2 operating system. Other computer hardware and operating systems, such as UNIX or DOS, may be used, with some modifications to the software. Although the Preferred embodiment uses C as its programming language, other programming languages may be used to implement the present invention.

The system 10 assists data analysts and systems analysts in building models of information systems of organizations. These models, or files, can be stored in a database and shared among analysts. In its preferred embodiment, shown in FIG. 1, the system 10 consists of four modelers, or editors, which can be used to build models, each of which gives a different perspective of the same design.

The system 10 further includes a controller 2 and a display 3. The four modelers include: the information modeler 4; the process modeler 5; the logic modeler 6; and the function modeler 7. Each of these modelers generate corresponding models or diagrams, having design data which may be created, analyzed, and modified by a user. These models and diagrams are referred to as the information model (IM), the information flow model (IFM), the Process Description Language (PDL) diagram, and the functional decomposition (FD) diagram, respectively. Each of these models and diagrams may be dynamically linked in the manner described in further detail below.

FIGS. 1—1 through 1-24 collectively show a detailed entity-relationship diagram of the preferred embodiment of the invention. FIG. 1A shows a diagram designating the relative position of each of FIGS. 1—1 through 1-24 to form a composite, complete entity-relationship diagram of the preferred embodiment.

The following TABLE 1 identifies, in column I, elements of the system shown in FIGS. 1—1 through 1-24. TABLE 1, column II, identifies corresponding names for certain of the elements of column I which are used in the description below.

TABLE 1

| Legend for FIGS. 1-1 Through 1-24 | |
|---|---|
| Column I | Column II |
| ABORT | abort |
| ABORT-CLOCK | |
| ALLOW-EXPRESSION | |
| ALLOWABLE-VALUE | allowable value |
| ANY-SELECTION | |
| APPL-ATTRIBUTE | |
| APPL-ENTITY | |
| APPL-P-SET | |
| APPL-PARTNERSHIP | |
| APPL-STRUCTURE | information structure |
| ARGUMENT | |
| ATTRIBUTE | attributes |
| BEGIN | |
| BETWEEN | |
| BLOCK | |
| CALLED-PROCEDURE | |
| CHAR-STRING | |
| CHOOSE | case |
| CHOOSE-BLOCK | |
| CLOCK | |
| COMMIT | commit |
| COMPUTE | |
| CONSTANT | |
| CONTINUE | |
| CYCLE | |
| DELETE | delete |
| DESTINATION | destination |
| DIMENSION | dimension |
| DISJOIN | |
| DO | do |
| DOMAIN | domain |
| ELEM-ATTRIBUTE | |
| ELEM-DOMAIN | |
| ELEM-VALUE | |
| ELSE | |
| ELSEIF | |
| END | |
| ENTERPRISE | |
| ENTITY | entities |

TABLE 1-continued

| Legend for FIGS. 1-1 Through 1-24 | |
|---|---|
| Column I | Column II |
| ENTITY-SET | entity-set |
| ERROR | |
| EVENT-OBJECT | event |
| EXIT | exit |
| EXPRESSION | |
| EXT-CALLED-PROCEDURE | |
| FIRST | |
| FLOW-ATTRIBUTE | flow-attribute |
| FLOW-ENTITY | flow-entity |
| FLOW-MODEL | |
| FLOW-P-SET | flow-partnership set |
| FLOW-PARTNERSHIP | flow-partnership |
| FLOW-STRUCTURE | message information flow contents |
| FOR-EACH | foreach loop |
| FOR-EACH-BLOCK | |
| FOR-EACH-TYPE | |
| GLOB-PROCEDURE | |
| GROUP-ATTRIBUTE | |
| GROUP-DOMAIN | |
| GROUP-VALUE | |
| IF | if |
| IF-BLOCK | |
| IM-CONDITION | |
| IM-PROCEDURE | methods |
| IM-PROCEDURE | entity methods |
| IM-PROCEDURE | attribute methods |
| IM-PROCEDURE | partnership-set methods |
| IMAGE | |
| IML | |
| IML-BLOCK | |
| INFO-BASE | |
| INFO-FLOW | |
| INFO-MODEL | information model |
| INFO-STORE | information-store |
| INST-APPL-ATTRIBUTE | |
| INST-ELEM-ATTRIBUTE | |
| INST-GROUP-ATTRIBUTE | |
| INST-SUB-ATTRIBUTE | |
| INST-TOP-ATTRIBUTE | |
| INT-CALLED-PROCEDURE | |
| INT-PROCESS | high-level process |
| IS-ATTRIBUTE | |
| IS-ENTITY | |
| IS-OBJECT | |
| IS-PARTNERSHIP | |
| IS-P-SET | |
| IS-STRUCTURE | |
| JOIN | |
| KEY | key |
| LAST | |
| LEAVE | skip |
| LEAVE-PROCEDURE | |
| LITERAL | |
| MAP | |
| MODIFY | update |
| MOVE | |
| NLS-CHARACTER | |
| NONE | |
| NOTE | |
| NUMBER | |
| ONE | |
| OPERATOR | |
| OTHER-ATTRIBUTE | |
| OTHER-ENTITY | |
| OTHER-P-SET | |
| OTHER-PARTNERSHIP | |
| OTHER-STRUCTURE | |
| P-SET | partnership-sets |
| PARAMETER | |
| PARTNERSHIP | relationships |
| PERSON | |
| PL-ATTRIBUTE | |
| PL-ENTITY | |
| PL-P-SET | |
| PL-PARTNERSHIP | |
| PL-STRUCTURE | |

TABLE 1-continued

Legend for FIGS. 1-1 Through 1-24

| Column I | Column II |
| --- | --- |
| PREDICATE | |
| PROC-BLOCK | |
| PROC-PROCEDURE | |
| PROCESS | processes |
| | process local store |
| RECEIVE | receive |
| | resume |
| RETURN | return |
| ROLLBACK | |
| SELECT | retrieve |
| SELECTION | |
| SEND | send |
| | signal |
| SORT | |
| SOUND | |
| SOURCE | source |
| STATE | |
| STATEMENT | |
| STOP | |
| STORE | create |
| STORE | insert |
| SUB-ATTRIBUTE | |
| SUB-VALUE | |
| TERM-PROCESS | primitive process |
| TEXT | |
| THEN | |
| TOP-ATTRIBUTE | |
| TOP-VALUE | |
| TRANSACTION | |
| TRANSITION | |
| VALUE | |
| VARIABLE | |
| VIEW-ATTRIBUTE | |
| VIEW-ENTITY | |
| VIEW-P-SET | |
| VIEW-PARTNERSHIP | |
| VIEW-STRUCTURE | information flow |
| | contents |
| WHEN | when |

Figures 1, 2:
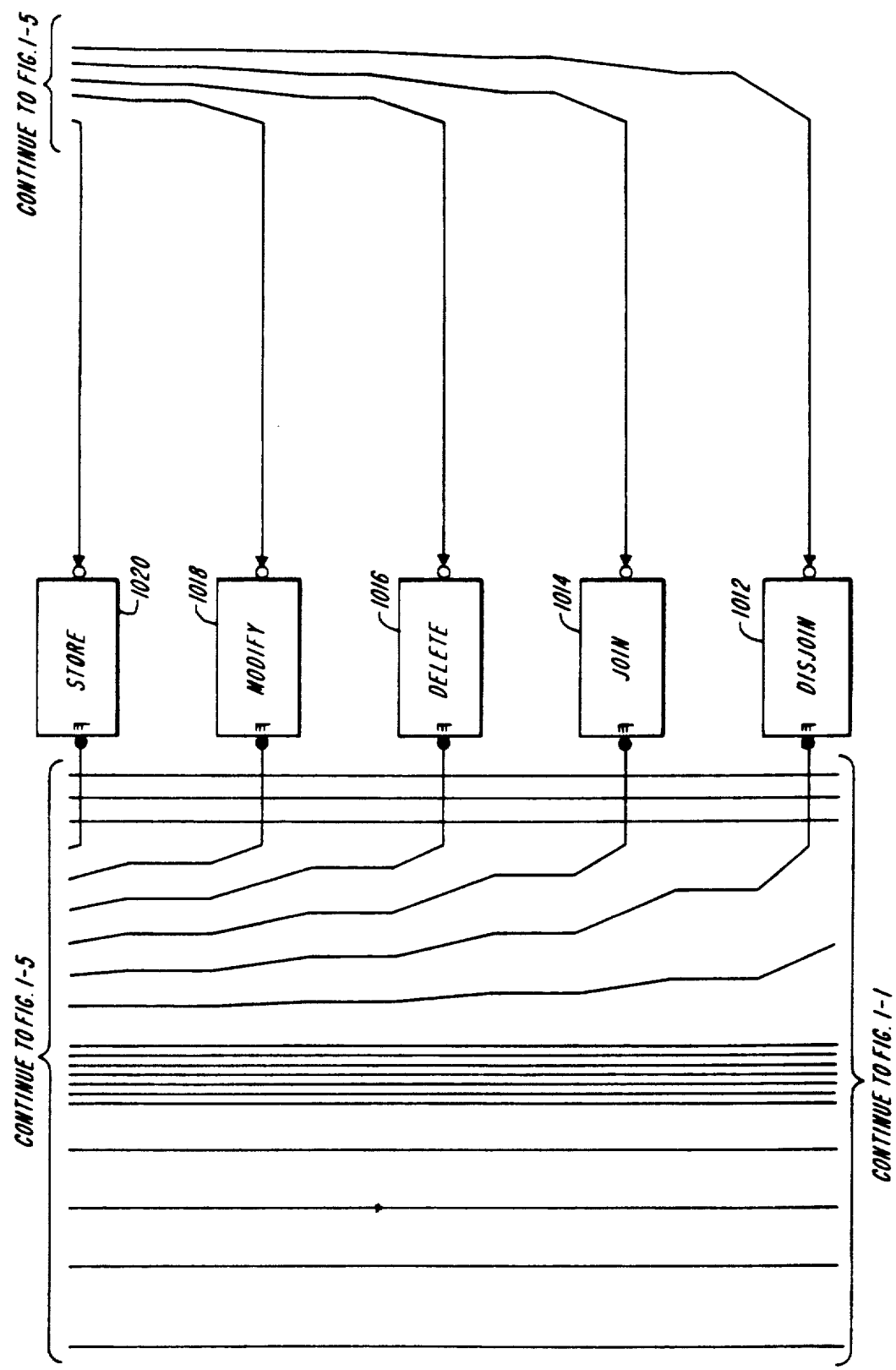

The primary interface between a user and the system of the invention is through a series of interactive graphics windows presented to the user in the display 3. The windows display text, tree structure diagrams, or other graphical representations of each of the modelers. As shown in FIG. 2. when a user accesses either the information modeler or process modeler, three windows will generally appear: an options facility 20; a feedback window 22; and, a diagram window 24.

The options facility 20 consists of a hierarchy of items which enable the user to perform actions on a specified model. By activating an element displayed in the facility, for example by placing and activating a cursor over the element, a selected model may be activated or deactivated. This facility may also display selections not presently available to the user at that time.

The feedback window 22 displays messages informing the user of one or more of the following: when an action has taken place; what step to take next; any mistakes or errors which may occur; when the user is entering or exiting a modeler or mode.

The diagram window 24 displays diagrams generated by each of the modelers. This window 24 generally includes the capability to scroll in any direction to view a diagram which is too large to fit in the window 24. Once a diagram is displayed in the diagram window 24, a user may edit the diagram, or create a new diagram. This window 24 also provides a dynamic environment for user interaction to the modelers.

Additional windows may be added or included in the present system. For example, pop-up windows (not shown), context menus 26, and icons (not shown) may appear at various times and at various locations on the CRT of a computer. Pop-up windows may be used to control user interactions with the system. Sometimes a pop-up window may be used to provide choices, or warn of a problem. Context menus may be included to enable the user to perform actions within a specific context, or model. An item in a context menu may function in the same manner as the corresponding item in an options facility, but may occur at different times or locations than the options facility. Icons may appear at various locations on the CRT, for example in the lower left corner when a model is initially opened, or as a reminder that other modelers and models are available.

Diagrams and forms of the system are tools used for defining and manipulating objects of the overall business information system model. Once an object is created using any of the modelers, or editors, of the system, it exists in the system and can be displayed graphically in any applicable diagram, or textually in a form. When an object is manipulated, the new information about the object is accessible from any applicable diagram or form, which provide different ways of accessing the same model objects by offering different perspectives of the same system.

An additional editor, the options modeler 5A, is available from the logic modeler 5. The options modeler is a language sensitive editor which prompts the user with grammatical options which may be inserted at any selected location. The modeler 5A defines what can be selected by the user and inserted into a PDL statement, which is further described below. The modeler 5A presents the options to a user in an options window, and shows only the next available syntactic phrase or term. Thus, at any point, the option modeler provides only syntactically valid options.

It is also possible to display subprocesses for a process contained in an information flow model concurrently with an information flow diagram in the diagram window. In the preferred embodiment, while an activated information flow model (IFM) diagram is displayed in the diagram window, a user may selectively display subprocesses to specified process within that IFM diagram. This "process explosion" is described in further detail in the section labelled "Process Modeler" below.

Since the four models are essentially views of the same information system design, an operation applied to one model using a particular modeler has an immediate effect on another model. This may be accomplished by maintaining logical relationships between the models, thus keeping the representation of design data consistent with the underlying design. It is important, therefore, that a change to a model or diagram in one modeler is reflected in other models and diagrams. For example, if a process is deleted through the function modeler, the deletion is automatically and immediately reflected in the IFM diagram. By way of further example, if a process having associated information flows is created through the process modeler, the information flow model objects, or IFM design data, are reflected in an activated PDL diagram. This change may occur substantially immediately, i.e. without any additional user input.

The preferred embodiment is a system designed for interaction with a human user. However, the system may also be incorporated into a larger system whereby the "user" becomes a generic "operator", such as another computer. The operator may include magnetic tape devices, which download information into the present system. Any other technology which permits transfer of design data, or information, such as laser disc memory devices, may be used. The operator may also be an artificial intelligence device which not only provides design data input, but is capable of dynamically interacting with the present system.

Information Modeler

Figures 1, 2, 3:
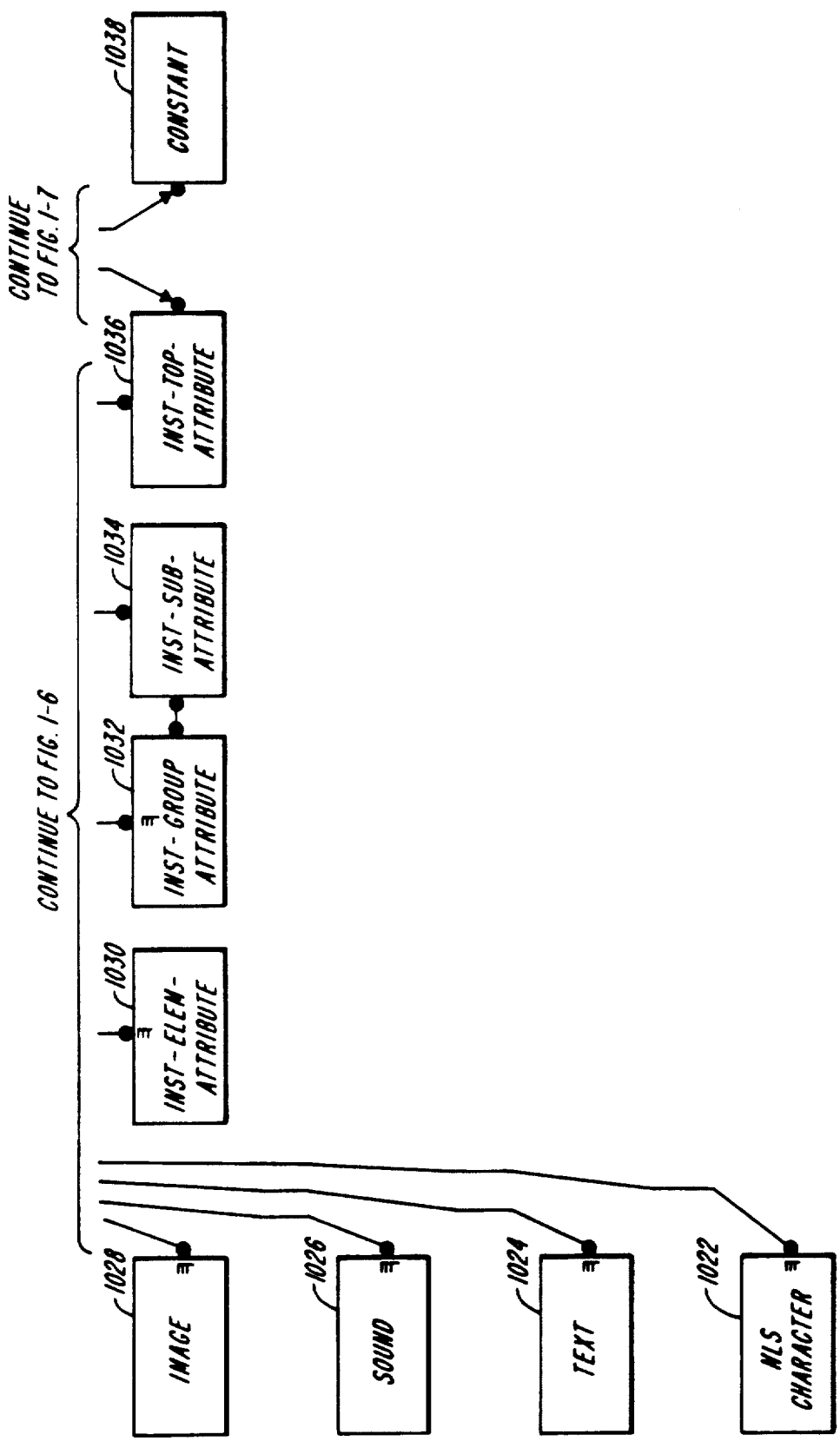
Figures 1, 2, 3, 4:
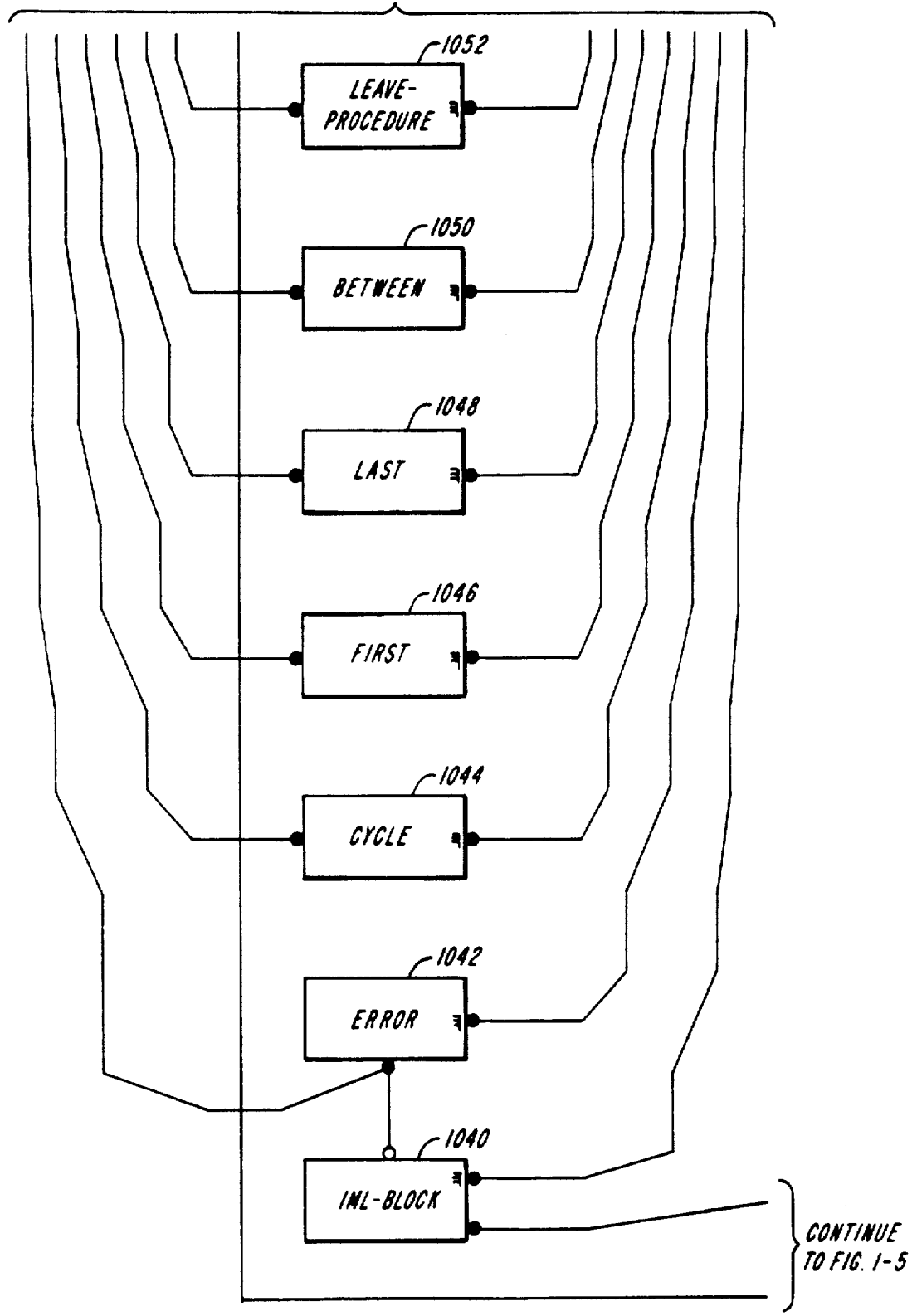

An information model describes the objects that are used within the system. The information modeler 4 of the Present system invention includes an editor for creating, analyzing, and modifying entity relationship data models, referred to below as information model (IM), and for generating entity-relationship (E-R) diagrams which describe relationships between entities An exemplary E-R diagram is shown in FIG. 3. The information modeler consists of IM design data, or IM objects, which may include entities, attributes, attribute methods, relationships, entity methods, keys, domains, dimensions, allowable values, and partnership sets. The modeler 4 also enables the operator to import existing information models created on other systems, or in other environments, into the present system 10.

As used in the field of the invention, the term "entity" is generally defined as an item about which information is being stored. An entity may be a tangible object, such as an employee or a part, or may be an intangible concept, such as a job title or an event. The term "attribute" is generally defined as properties of entities. For example, for an entity "customer", attributes may include address, company affiliation, or salary. A "relationship" describes the correlation among entities, or among attributes. Alternately, attributes may be "free" attributes. Free attributes are attributes not associated with an entity. For example, an attribute may be used to hold constants, or contents of flows that go between processes A free attribute may later become associated with an entity, or may remain independent.

"Partnership sets" are described in detail in U.S. Pat. No. 4,631,664 (Bachman, Dec. 23, 1986). In the present system, partnership sets are used both for storing and manipulating information. Thus, using the information modeler 4, a user may define objects within the system as partnership sets. Internal to the system, partnership sets are established to provide the medium through which design data is accessed and exchanged among the modelers of the present system.

An "entity method" is a PDL procedure (defined below) attached to an entity in an E-R diagram rather than to a process in the IFM diagram. Each entity method defines a generic operation to be Performed on all occurrences of the entity, similar to methods in object-oriented programming. The use of entity methods protects applications from changes made in the design data model. Similar to an entity method, an "attribute method" is a PDL procedure associated with an attribute.

A typical use for an entity method might be to specify a referential integrity rule required by a user's business. For example, a company may have a rule that requires the "last-customer-number" attribute to be incremented by one each time a new customer is created, and the assignment of that number to the new customer. The traditional "process-centered" approach would force all developers of applications to include the code for this operation each time an application creates a new customer. However, a "create-customer" entity method may be created to handle this operation. Then, whenever an application creates a new customer, the developer calls the "create-customer" entity method which insures that the "last-customer-number" attribute is incremented by one and assigned to the new customer.

A "derived attribute" is an attribute having a value which is calculated each time it is used in a procedure. The value is not stored in the database, but is recalculated when it is used. For example, for a transaction-based system, a user might create a derived attribute, called "total-tax", that calculates the total sales tax for each sales transaction. A PDL statement is then used to create a derivation rule, which sets the derived attribute "total-tax" equal to 5% of the value of the stored attribute "subtotal-taxable." Once a derived attribute is created, it can be used in the same manner as any other attribute derived in an E-R diagram.

A key is one or more entity components that uniquely identifies an occurrence of an entity. For example, every house has a unique address and every employee has a unique employee identification number. In the preferred embodiment of the system, unique keys may represent one or more attributes, partnership sets, or a combination of both attributes and partnership sets. Keys may be primary, alternate, or foreign. A Primary key represents a combination of attributes and/or partnership sets that uniquely identify each occurrence of an entity. For example, "Emp-Address" attribute of an Employee entity.

Any key other than a primary key is an alternate key, which may later become a primary key. For example, a customer can be uniquely identifed by a customer identification number, or by a name and address combination. A user can choose either identification form as the primary key for the Customer entity. The other key is then an alternate key.

Foreign keys represent attributes and/or partnership sets used to establish a recursive relationship or a relationship with another entity or partnership set. Attributes within the entity may correspond to some or all of the attributes in the primary key of a partner entity. That is, a foreign key is a primary key in one entity that acts as a unique identifier in a partner entity, a partner entity essentially being referenced by the primary key in the other entity.

To create a new information model, the user selectively interacts with the options facility 20 to the information modeler 4 to indicate that a new file is being created. The options facility 20 may include various forms of information display, such as a palette, a dialog box, or context menus, depending upon the type of information to be displayed and/or ergonomic criteria. The new information model (IM) is named, and identified as to type of model. In the preferred embodiment, a diagram is generated in the diagram window 24. An operator may then create an IM by creating and placing IM design data, or objects, in the IM diagram. The IM design data may include entities, with associated attributes, relationships, text blocks, and entity methods. In the preferred embodiment, IM design data may include at least the following objects and combinations: attributes; attribute methods; entities; entity methods; partnership sets; partnership set methods; entities and relationships; entities and attributes; and entities, relationships, and partnership sets.

Figure 3:
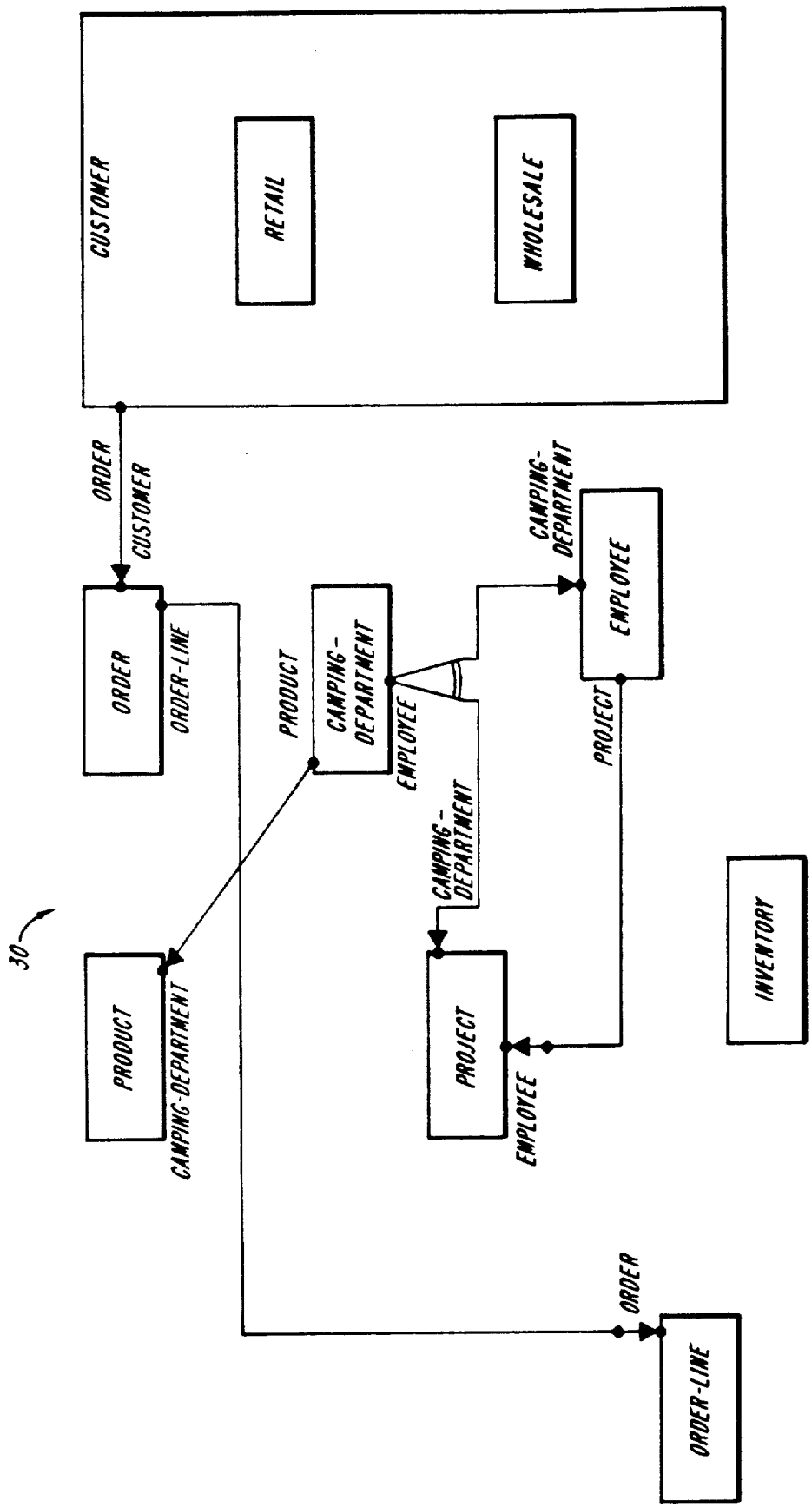
Figure 3A:
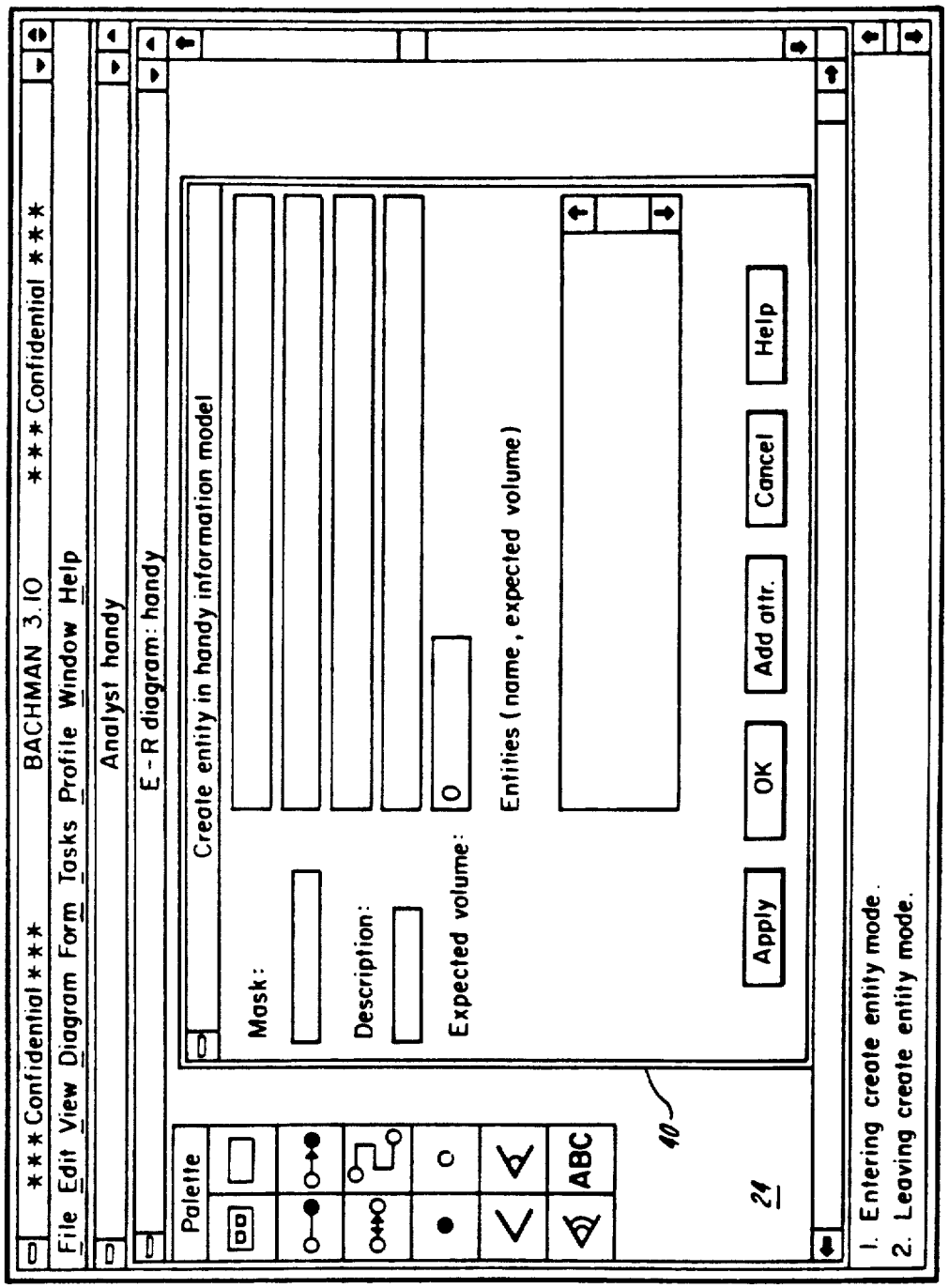
FIG. 3A is a diagrammatic representation of a "create" form which may be accessed through an IM modeler of the invention of FIG. 1.

To create one or more entities, an operator selects an element in the context menu 26 corresponding to "create". A "create" form 40, shown in FIG. 3A, is then displayed in the diagram window 24. The operator then describes the entity by entering the following information: entity name; description; name of parent entity; and expected volume. This information is then stored, and selectively displayed upon later recall by either the operator or one of the modelers.

Attributes may be created in a manner similar to entities, and are described by the following information entered by an operator: attribute name; description; expected length; domain; data type. Data type of an attribute generally may include integers, strings, and the like. Domains may be used to define useful, recurring data types. For example, "date" is a domain, made up of separate pieces of data, each of which may be defined as subdomains. Attributes may only be assigned superior domains as data types. A domain can consist of one or more pieces of data. In the present system, deleting a domain does not delete attributes with that data type, but does leave attributes without data types. Dimension allows a user to group domains which are comparable in value. For example, a value space may have one or more representations such as U.S. format (e.g., Nov. 2, 1990), or European format (e.g., Nov. 2, 1990). By making a dimension "date", all attributes having "date" data type, regardless of format, will be shown.

In the preferred system, attributes may be created independent of entities. Using the partnership set protocols described in U.S. Pat. No. 4,631,664, relationships may be one-to-one, one-to-many, or many-to-many, depending upon the type and complexity of the system or model created.

Figure 4A:
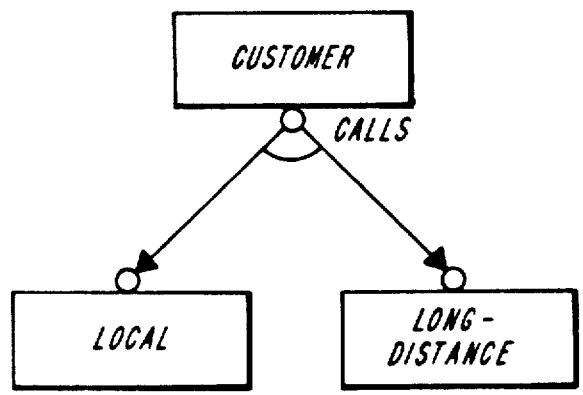
FIG. 4A is a diagrammatic representation of a network diagram display of the invention of FIG. 1.
Figure 4B:
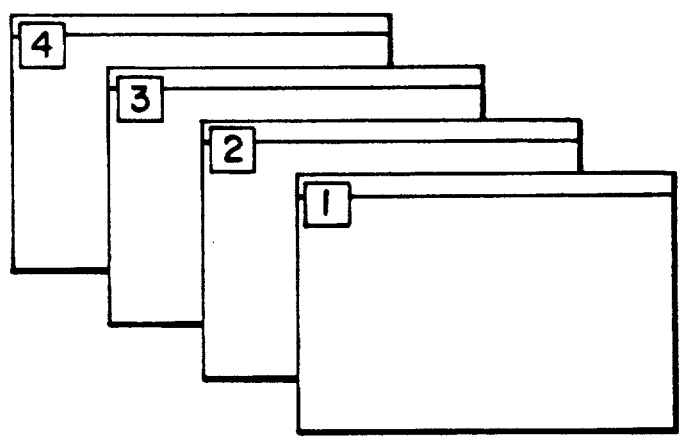
FIG. 4B is a diagrammatic representation of multi-layered overlapping boxes display of the invention of FIG. 1.
Figure 5:
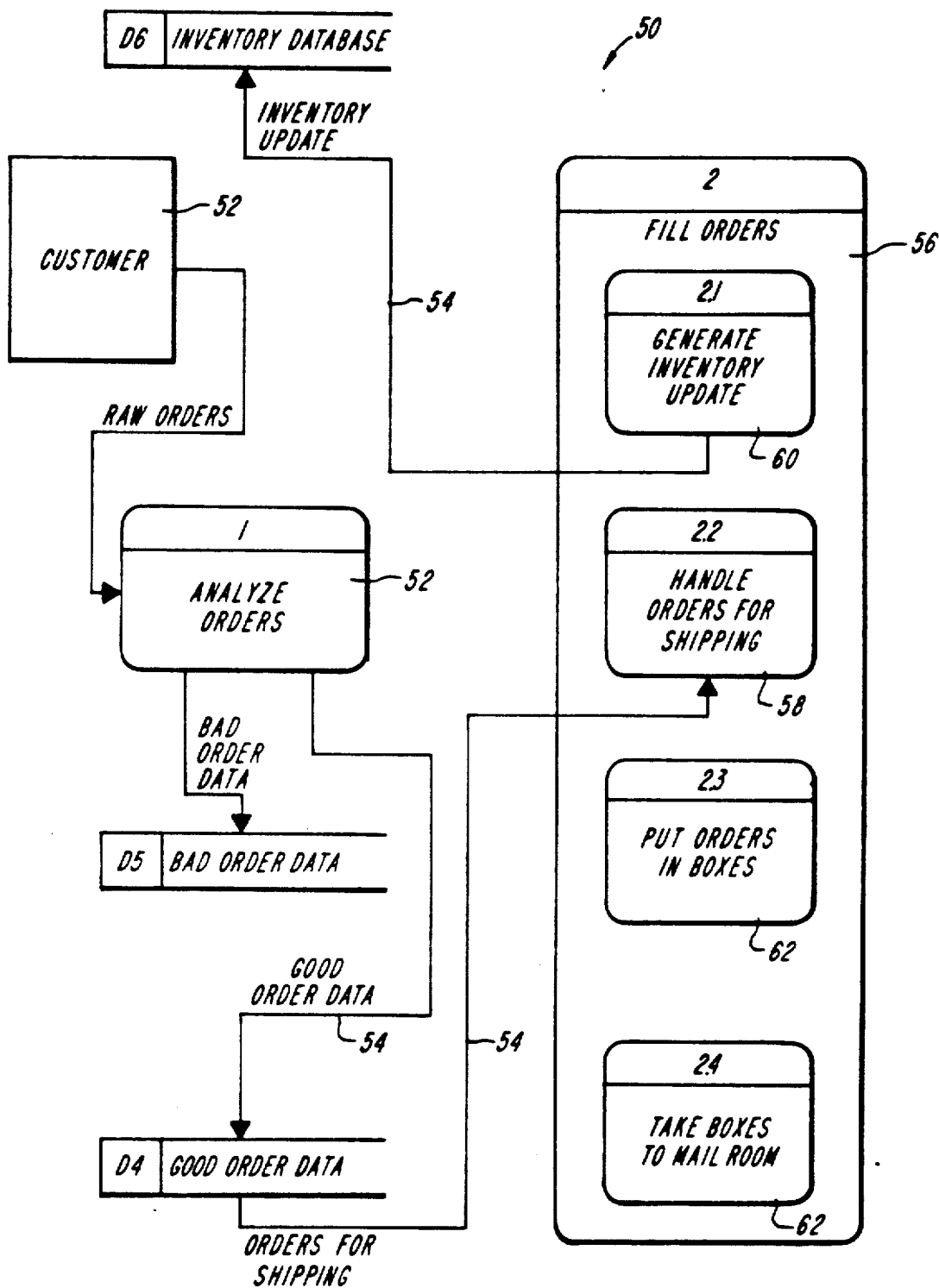

Once an IM is created, it may be displayed as an IM diagram, as either network diagrams or multi-layered overlapping boxes, shown in FIGS. 4A and 4B. Other graphical representations may be used, such as text or tree structure diagrams (not shown). Each design data, or object, of the diagram, or text, may be dynamically activated by the user to modify, analyze, or create the associated IM. Thus, the information modeler 4 may be accessed by the operator by means of the diagram window 24. In a similar manner, the IM diagram 30 may be manipulated as to size or object location. In the preferred embodiment, a pointing device, such as a mouse, is used in conjunction with the system 10 to manipulate a pointing icon in the related windows. Thus, the pointing icon may be used to expand or contract the size of the diagram, the size of the design data associated with the diagram, and placement of the design data in relation to the diagram.

Process Modeler

Figures 1, 2, 3, 4, 5:
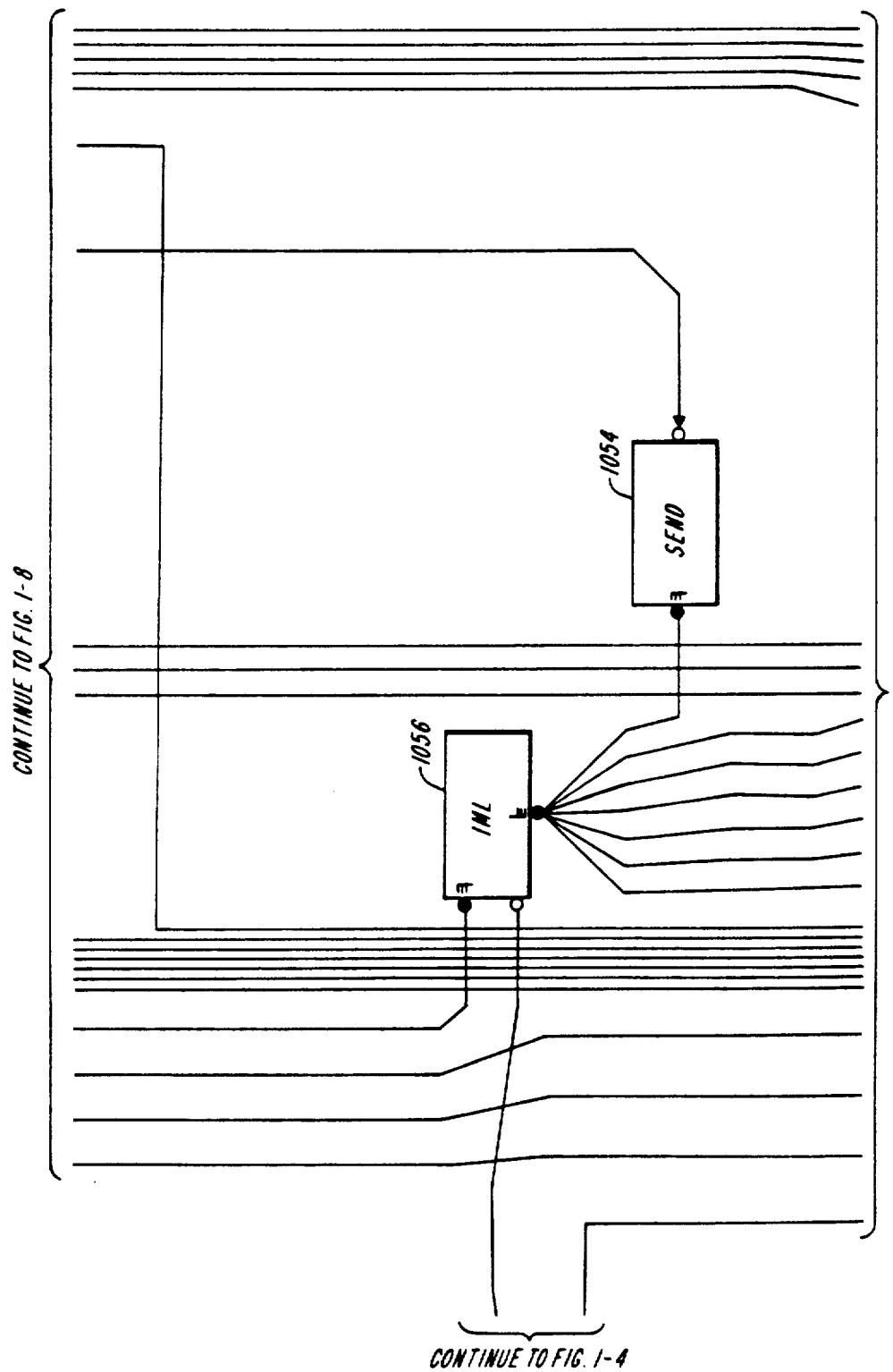
Figures 1, 2, 3, 4, 5, 6:
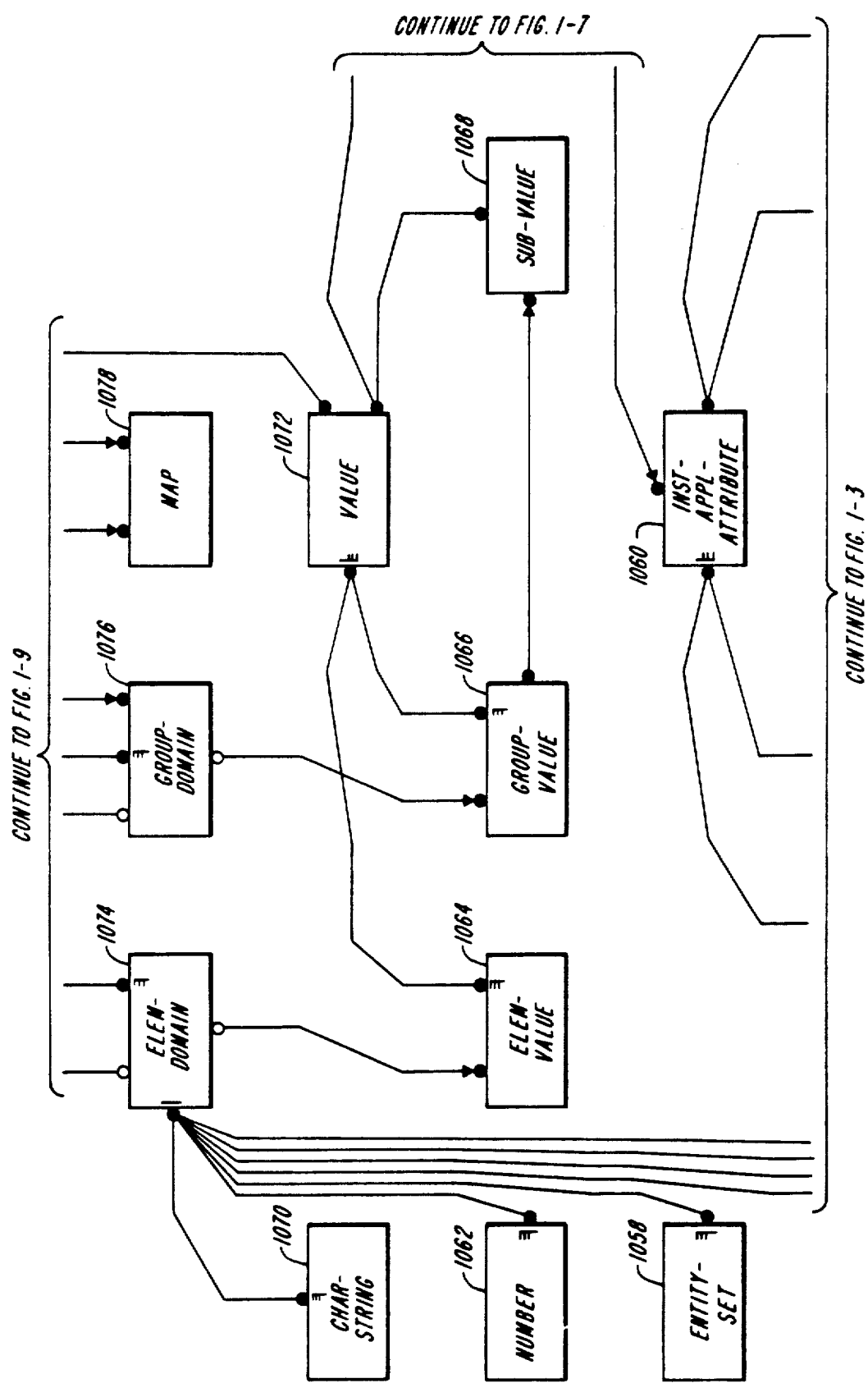

The process modeler 5 of the preferred embodiment is an editor used to define an information flow model (IFM). An IFM describes a function that occurs within the system. The process modeler 5 enables an operator to define the processes, information stores, information flows, messages, and sources/destinations of the system. The information store of a process modeler 4 corresponds to design data elements in an IM. The information flow of a process modeler represents the flow of design data elements which are usually defined in an IM. Therefore, in the preferred system 10, the IM is generally established before the related IFM. The IM to which an IFM is attached can be empty; that is, it does not have to contain entities, attributes, or other elements. Thus, an operator may begin modeling a system with an IFM diagram, generated through the process modeler to describe relationships between objects in a process model. An exemplary IFM diagram 50 is shown in FIG. 5.

A new IFM can be created through the process modeler 5 in the same manner that a new IM can be generated through the information modeler 4, as discussed above. Generally, creating a new IFM requires operator input of the following: a model name; identification of an associated information model; target database in which the IFM will be stored; and model type. An IFM diagram may be associated with the process modeler 5 such that a user may dynamically interact with the diagram in creating, analyzing and modifying an IFM.

Once an IFM diagram is generated, after the above-mentioned information is entered by the user, IFM design data, or IFM objects, may be selectively placed on the IFM diagram. The IFM design data includes processes, information flows, messages, sources/destinations, process local stores, events, flow-partnership, flow-partnership set, flow-entity, flow-attribute, and information stores. After one or more IFM design data are created by the operator, information flow can be added between them. Duplicate names for design data or flows are generally not accepted within an IFM.

In the preferred embodiment, an information flow may be added to the model once at least two processes, or a process and an information store, or a source/destination object are present. Generally, data cannot flow between two information stores, or between two source/destination objects without an intervening process. Therefore, the preferred system accesses information flows created between two processes, between a process and a source/destination, or between a process and an information store. The contents of an information flow are generally referred to as messages, which may consist of design data.

Information stores may be created to contain one or more entities, and may be included in the process model. There is an association between information stores and entities, which may be graphically represented in E-R diagrams. An entity may exist in one or many information stores. Therefore, the IFM diagram, IM diagram, and associated process model and information model forms are linked by the association of the information store and the entity. Forms, like diagrams of the preferred system, may be used as tools for defining and manipulating all objects of the system. Diagrams and forms provide graphical and textual ways of accessing the same objects of the system.

In the preferred embodiment, Events are the that control flow design data in the IFM diagram. Examples of Events include Clock/Calendar Events, User Events, Database Events, and Flow Events. A Clock/Calendar Event may indicate that a process is to execute at a specified time. For example, a user might specify a process to run every day at 2:00 pm. User Events generally correspond to a user demand, for example, an explicit "run this process". A Database Event may be a mechanism that initiates the execution of a process based on the changing of an information store value. For example, if a customer goes from having good credit to having bad credit, this might trigger the "send threatening letter" process. A process triggered by a Flow Event begins execution upon the arrival of the flow structure. Flow Events must correspond to a flow going to that process, or a triggering flow.

While Events generally appear in IFM diagrams, there may be corresponding clauses in other modelers of the system. For example, in the preferred embodiment, a Triggered-When clause in the logic modeler corresponds to the IFM diagram Event for that process. Further, in the preferred embodiment, every completely specified primitive process (described further in the "Function Modeler" section, below) must have a triggering Event associated with it. This Event is what actuates the process, forcing it to begin "executing" its business logic.

Source/destination objects may be defined to direct information in an IFM. In the preferred system, these objects may be included in the IFM diagram to indicate the source or destination of IFM design data of that diagram.

The size of an IFM diagram 50 may be changed, enlarged or diminished, to accommodate the viewing needs of a user. In the preferred embodiment, a user can generate an expanded view of a selected process or design data element. The size of the IFM diagram 50 may also be changed to accomodate an overlapping, or superimposed exploded process or function decomposition diagram (described below). In addition, the layout of the IFM diagram 50 may be modified by moving IFM design data, for example, boxes and graphical representations (arrows) of information flows 54 connecting the boxes, as shown in FIG. 5.

Once a process is created it may be divided into lower-level processes or subprocesses. Dividing a high-level process into two or more subprocesses is referred to as "explosion". In the preferred embodiment, the process to be exploded must have at least one information flow attached to it, either incoming or outgoing. In other forms, such a restriction is not necessary. When a process is exploded, the number of subprocesses generated and named by the system for the exploded process equals the number of flows coming into and out of the process.

In one embodiment, a subprocess 58 related to an incoming flow has the word "handle" as a prefix to its name; a subprocess 60 related to an outgoing flow has the word "generate" in its name. Subprocesses 62 may exist within a process 56 which have neither incoming nor outgoing flow associated therewith. For example, as shown in FIG. 5, a Process "fill orders" may be divided into subprocesses "generate inventory update", "handle orders for shipping", "put orders in boxes", and "take boxes to mail room".

Thus, an IFM diagram may contain both high-level processes 56 and primitive proccesses 62. High-level processes 56 are those processes having subprocesses associated therewith. Primitive processes 62 are those processes having no subprocesses. Once a process is exploded, the subprocesses may be displayed through a functional decomposition diagram 80, (defined below), or superimposed over a segment of the IFM diagram.

In the preferred embodiment, a user can simultaneously and concurrently view an IFM diagram 50 and an exploded process 56 in the same diagram window 24. For example, a user may use a pointing device to point to an icon representative of a high-level process 56 in an IFM diagram 50, and display the "explosion", or subprocesses, of that process, while maintaining the other processes on the display screen. A user may also display or hide the subprocesses in a corner window, leaving the IFM diagram intact. Subsequent changes to an IFM object or process in either window would be reflected in the other window.

Conversely, the subprocesses can be hidden in the high-level process using process "implosion", resulting in a display of only the high-level process.

Figure 6A:
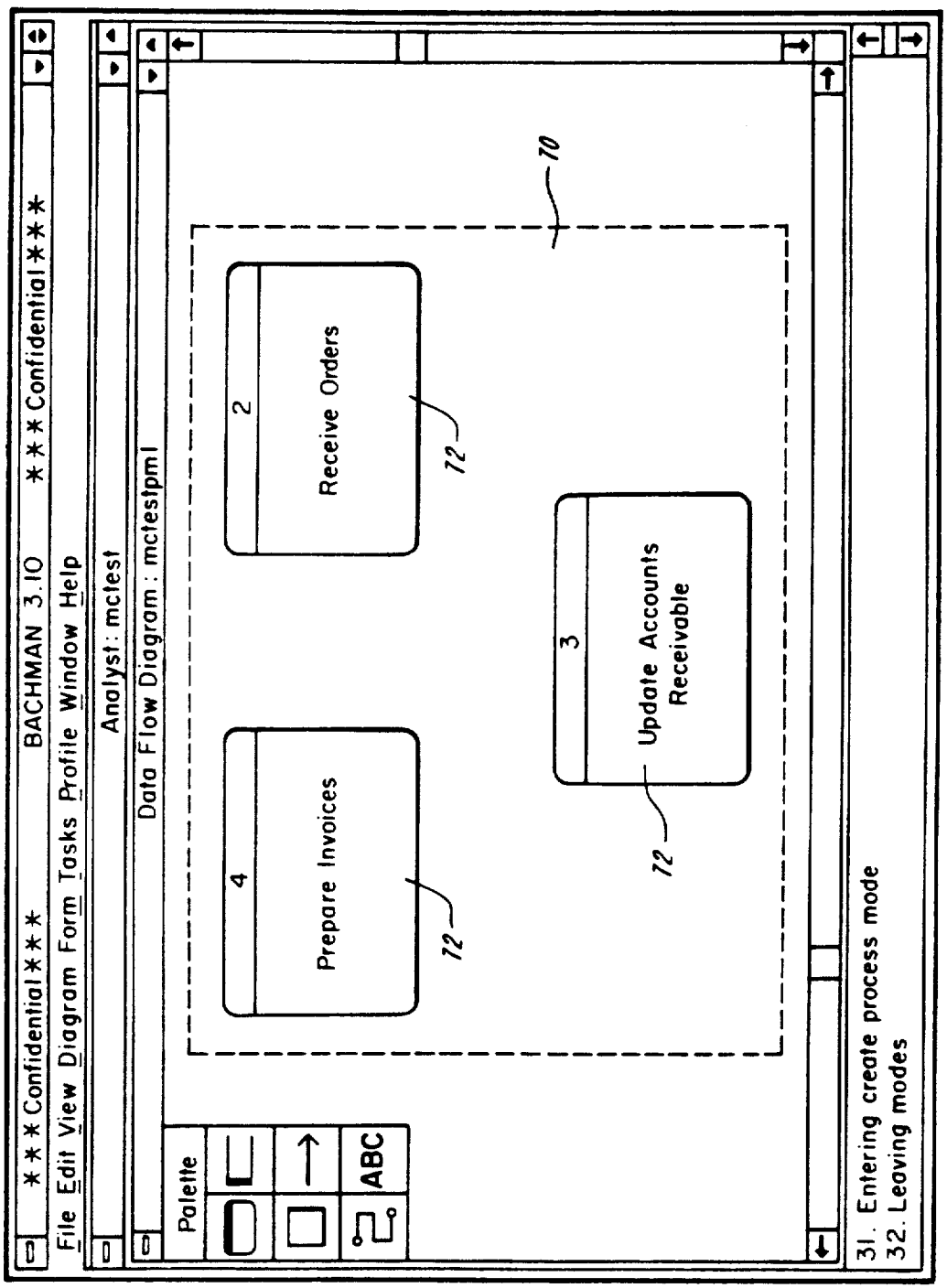
FIG. 6A is a diagrammatic representation of an IFM diagram display of the invention of FIG. 1 having exploded processes, prior to creating a new process boundary.
Figure 6B:
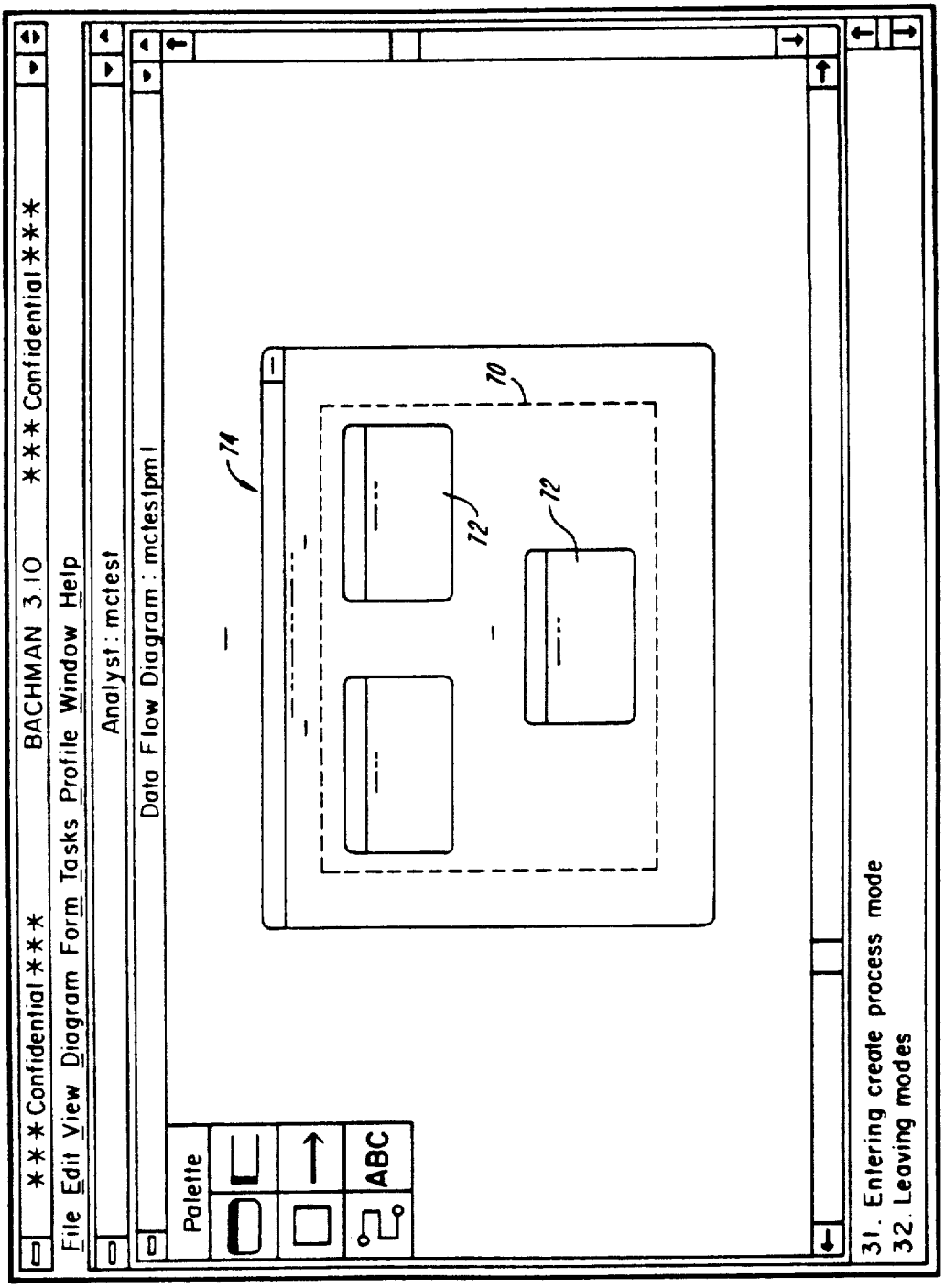
FIG. 6B is a diagrammatic representation of an IFM diagram display of the invention of FIG. 1 having a new process incorporating subprocesses.
Figure 7:
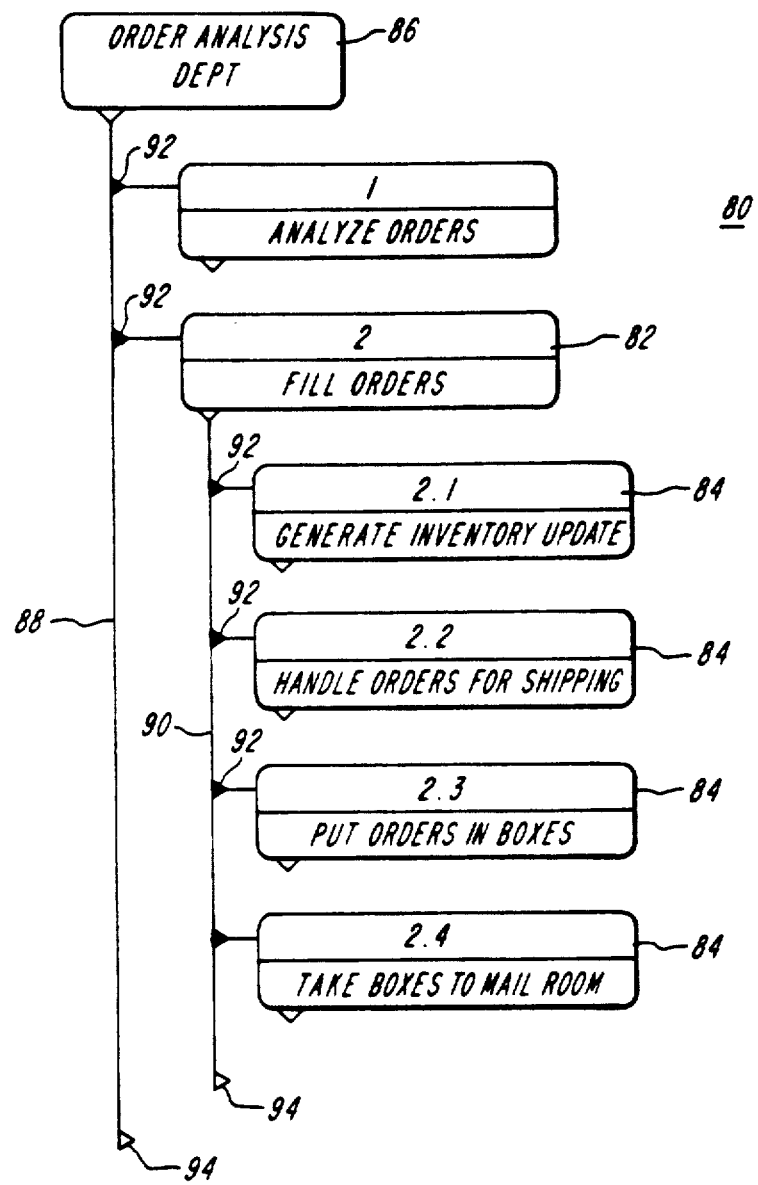
Figure 8:
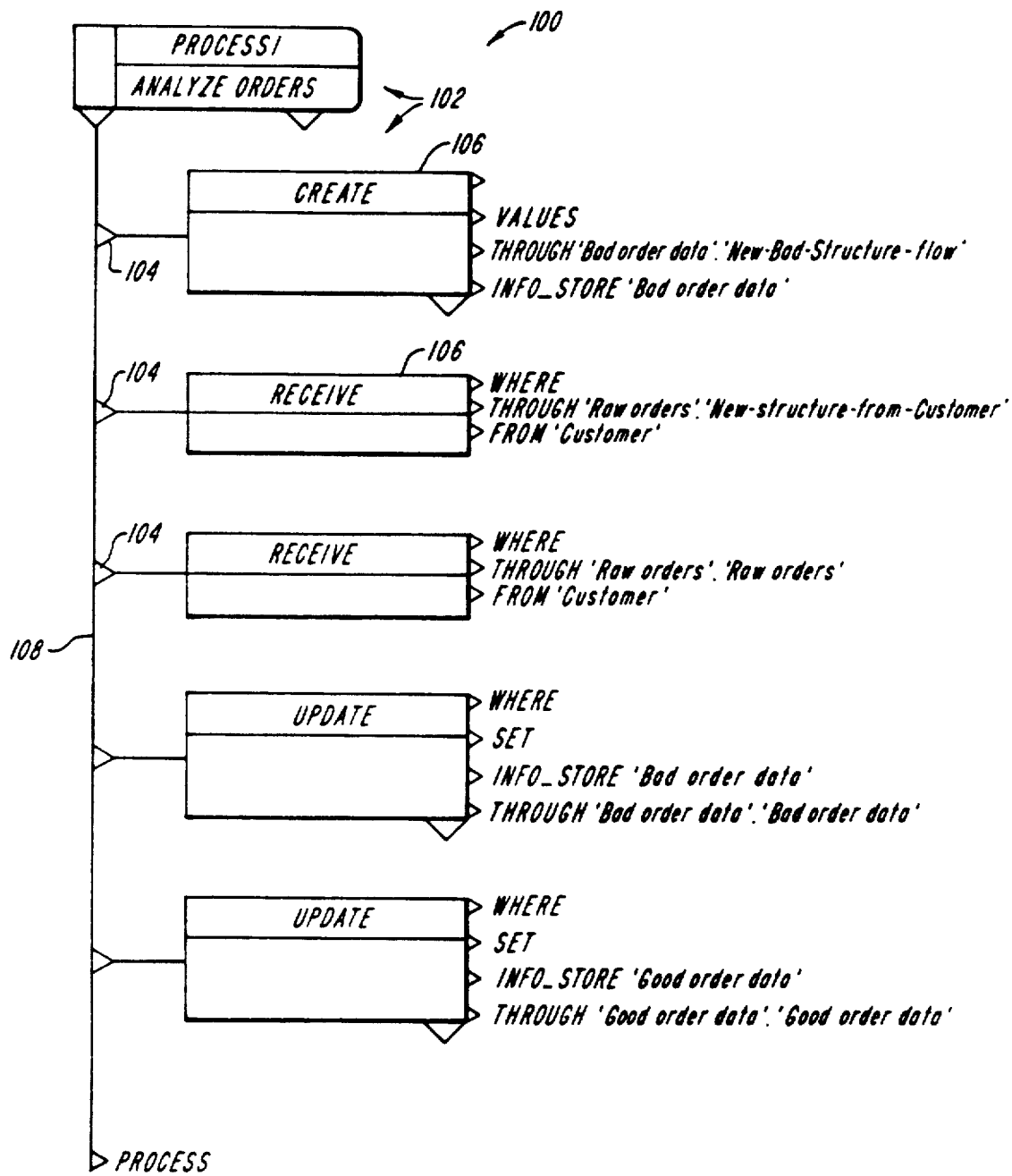
Figure 9:
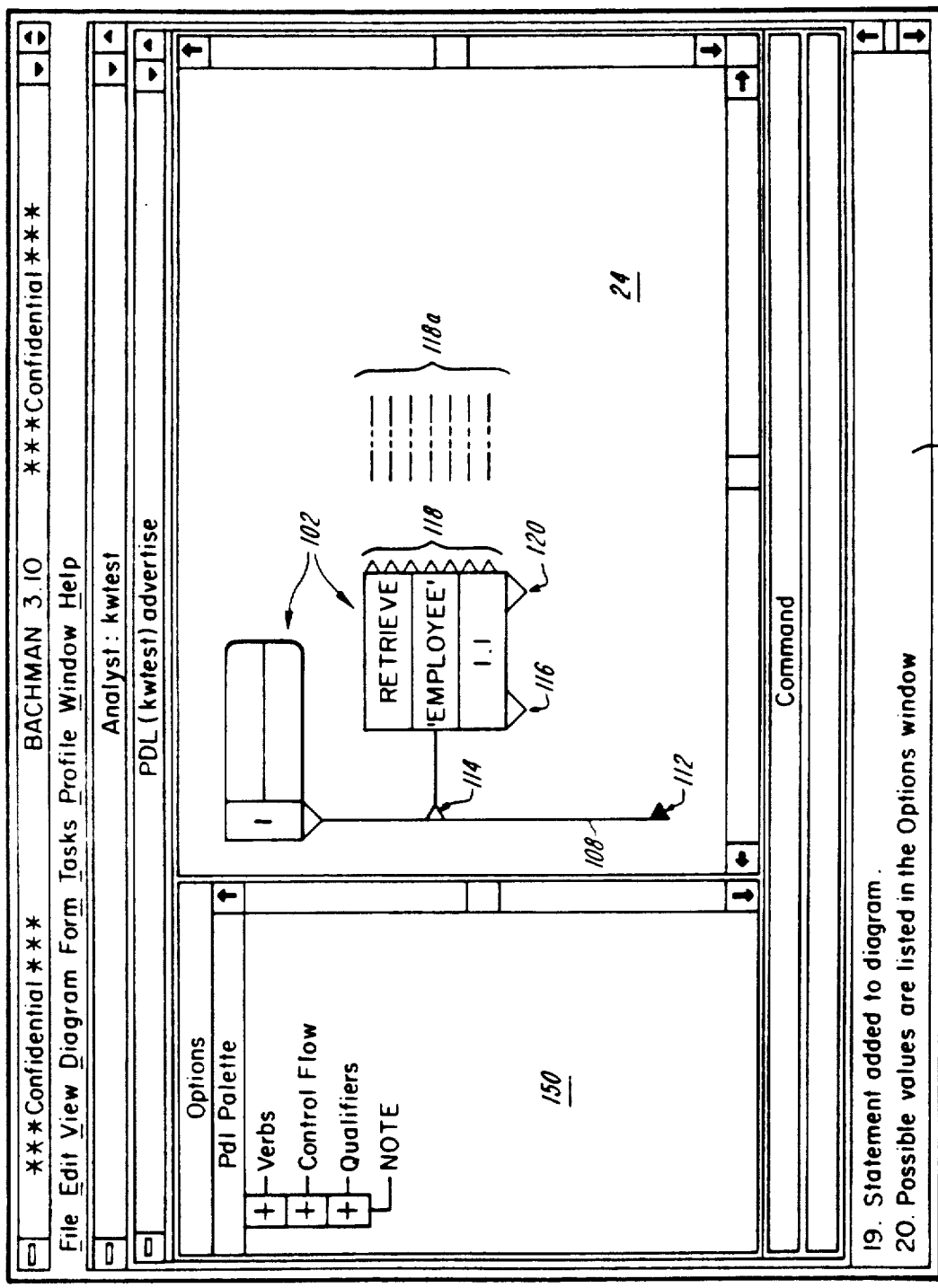
Figure 10:
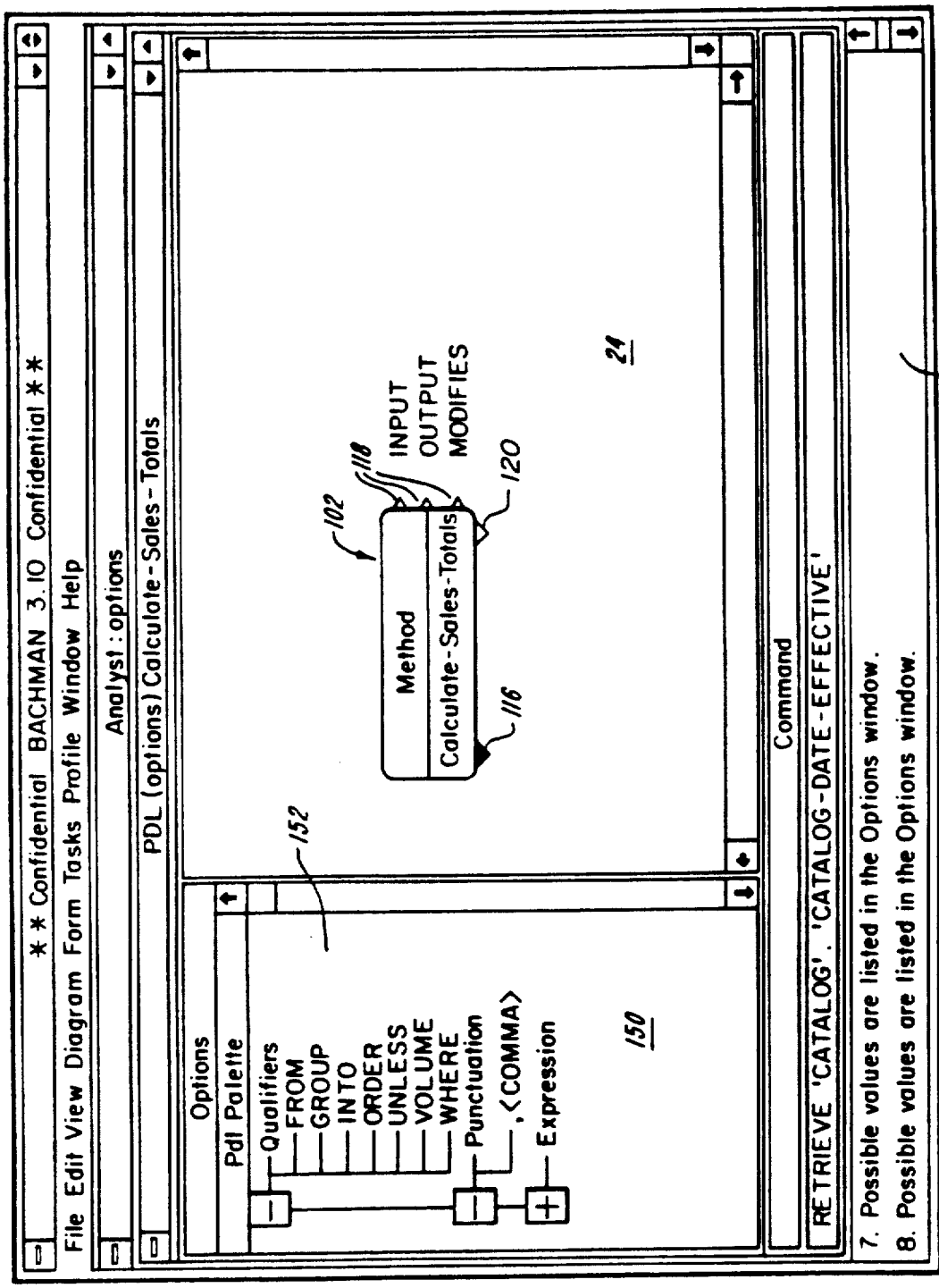

In an IFM diagram 50 a user can create a high-level process 56 for a process or group of Processes by defining process boundaries 70. In the illustrated embodiment, and as shown in FIGS. 6A and 6B, the system prompts the user to name the new high-level process, and then draws the new process 74 around the selected, or "boundaried", processes 72. The original processes 72 become subprocesses of the new process 74. Making a new process boundary 70 is a way of changing the hierarchy of processes in the process model. Each new high-level process has a form. This form lists the subprocesses in the process hierarchy fields of display. Likewise, the forms for each subprocess list the new process as the top-level process. In a similar manner, process boundaries 70 may be undone, returning the process model to the state it was in before the process boundary 70 was created.

Function Modeler

Figures 1, 2, 3, 4, 5, 6, 7:
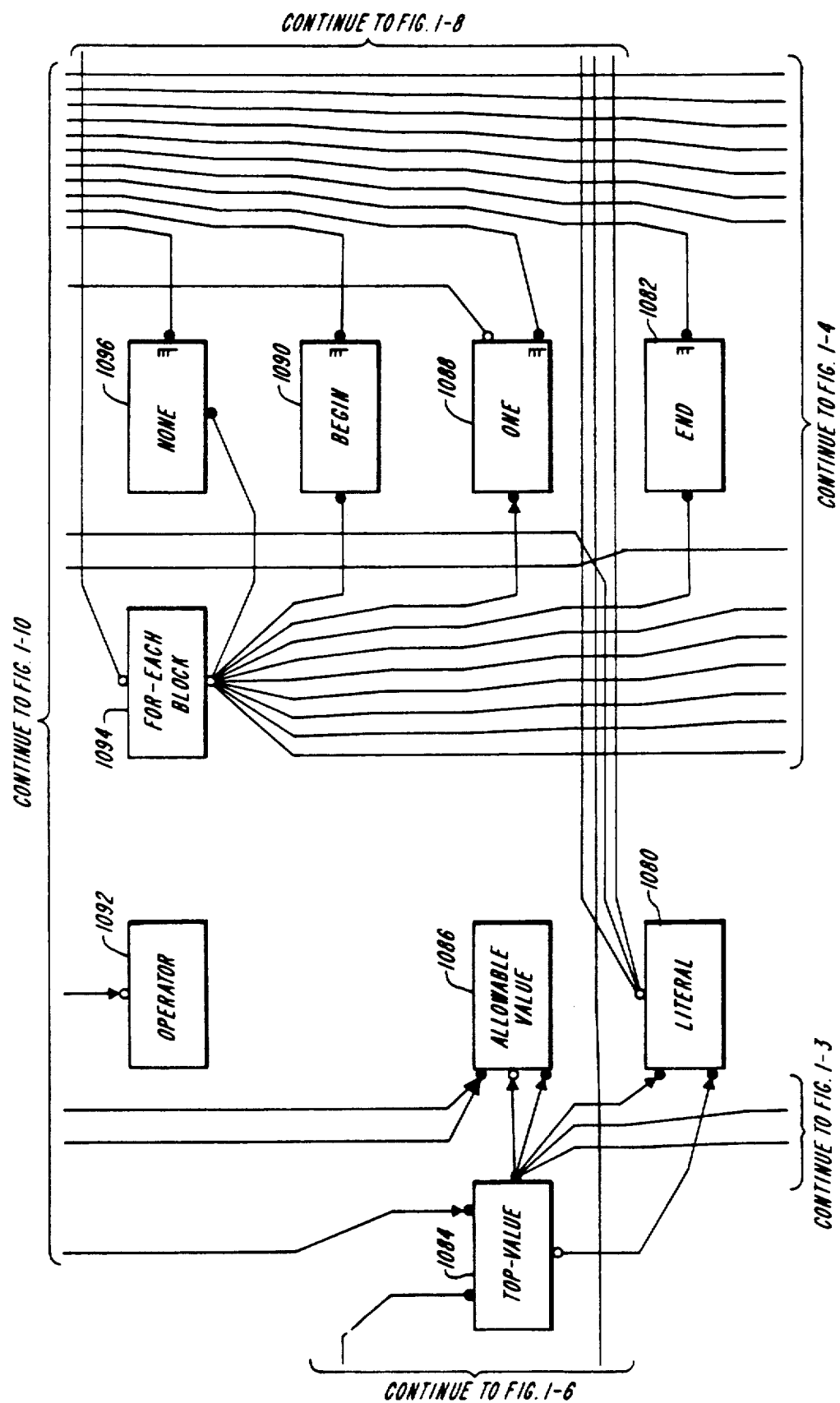

Once an IFM containing process is created, the function modeler 7 may be invoked to generate and display a function decomposition (FD) diagram of the process, as exemplified by diagram 80 shown in FIG. 7. The decomposition diagram 80 consists of subprocesses 84 identified by the operator to be associated with an identified process 82. For example, as shown in FIG. 7, if the process 82 is identified as "fill orders", subprocesses 84 identified with that process 82 may include, "generate inventory update", "handle orders for shipping", "put orders in boxes", and "take boxes to mail room". In the preferred embodiment, a pointing device, such as a mouse, is used to select a process displayed in an IFM diagram. By selecting a process with the pointing device, a decomposition diagram may be superimposed over all or part of the IFM diagram.

A typical FD diagram 80 of the present invention is shown in FIG. 7. There, the diagram 80 is a tree-structure type diagram, having nodes containing process description 86, process 82, and subprocess 84. The relationship between the nodes is shown graphically by a main line 88, and branch lines 90. The nodes are each connected to the lines 88, 90 at root pins 92. Each of lines 88, 90 also has an extension pin, 94 at which nodes may be attached.

An important aspect of the present invention is that the FD objects of the FD diagram 80 are dynamically linked to the IM and IFM objects such that a change to the FD diagram 80 (FIG. 7) is substantially immediately reflected in the IFM diagram 50 (FIG. 5) and the design data sets of both the information modeler and the process modeler.

In addition, a FD diagram 80 may display subprocesses 62 created in a process explosion. Thus, there are two ways in which subprocesses 62 may be created and displayed: using the process explosion from an IFM diagram 50; or using the function modeler to create a FD diagram 80.

Logic Modeler

The system 10 of the invention also includes a logic modeler 6 which specifies the logic of primitive processes defined in an IFM. The logic modeler 6 primarily embodies a graphical, structured language which enables a user to define business logic of the processes that operate on entities defined in an IM. The logic modeler 6 may be used to define logic models for describing the flow of information between models.

The logic modeler 6 refers to entities and attributes in the IM as it defines the logic that operates on the entities and their attributes according to the organization's business rules. For example, the business rule for deriving an attribute can be expressed in the logic modeler 6 and stored.

Figures 1, 2, 3, 4, 5, 6, 7, 8:
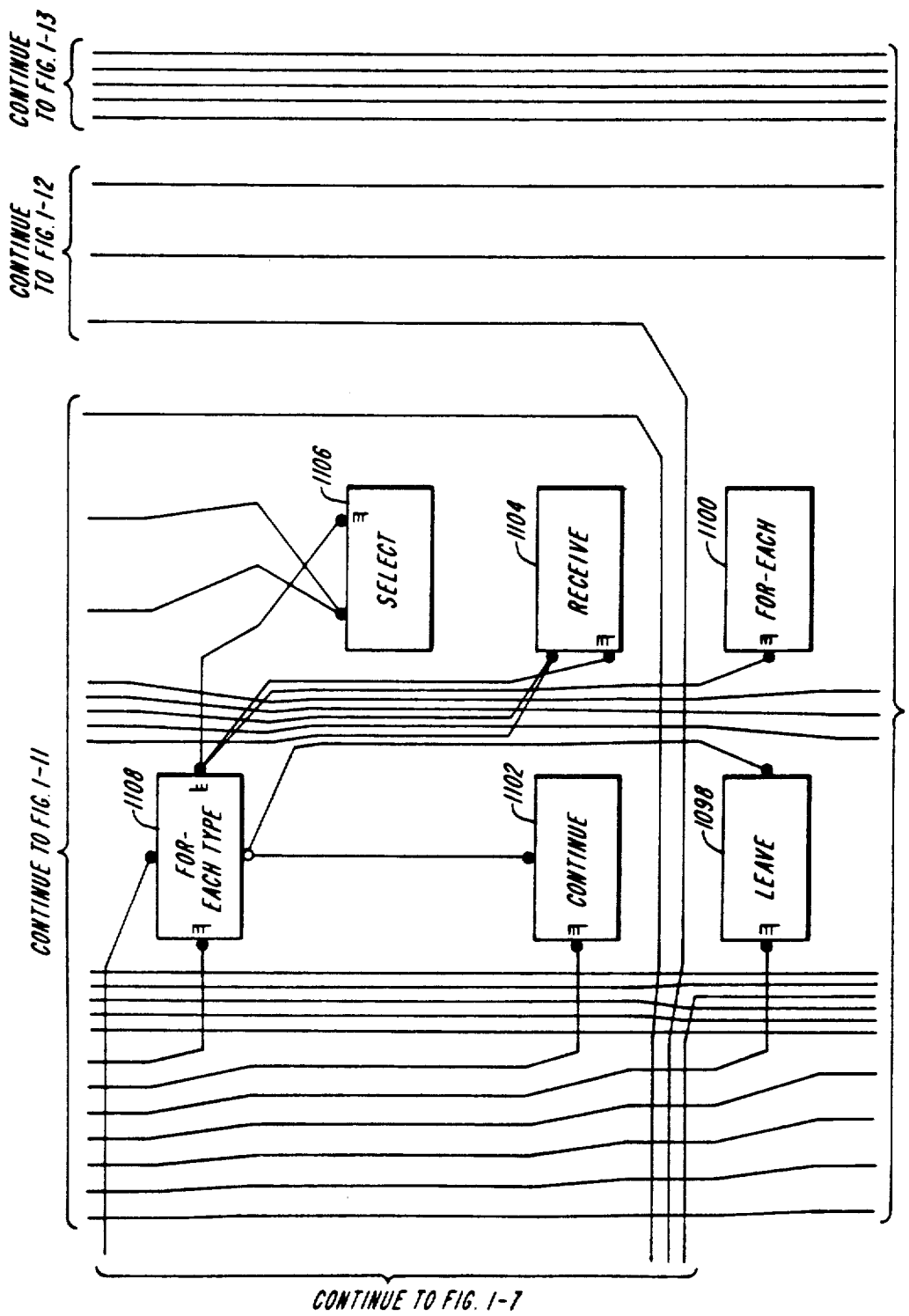

In the preferred embodiment, the structured language is a Process Description Language (PDL), which shows the flow of processing in relation to objects in the IFM and the specific operations performed on entities and attributes in the information model. The logic modeler 6 is generally related to an IFM and to an IM. As shown in FIG. 8, a PDL diagram 100 may be built by creating PDL statements, one at a time, in a window. The system then automatically generates graphical representation of the statement in the PDL diagram 100. The logic modeler 6 includes PDL procedures and PDL statements in describing and displaying logical operations on objects. As discussed above, entity methods and derived attributes may be used to define a procedure on an entity in the corresponding IFM diagram 50. PDL procedures may also include process procedures, which describe the business logic of the primitive process, and derived attributes, which are attributes having a value calculated each time it is used.

PDL statements may be used to build procedures and write specifications that describe the business logic of primitive processes in a corresponding IFM diagram. Statements may be built by a user or generated by the system, using keywords, identifiers, and expressions. Keywords which may be used in building PDL statements may include, inter alia: CREATE; RETRIEVE; UPDATE; DELETE; SEND; RECEIVE; SIGNAL; and, WHEN.

In the system of the present invention, several types of statements are available, including logical access statements (RETRIEVE, CREATE, UPDATE, DELETE), iteration statements (FOREACH, and LOOP), conditional statements (IF, CASE), and control transfer statements (EXIT, SKIP, RESUME). Logical access statements describe selecting or changing data defined in information stores. These statements are equivalent to statements that describe database access in a physical database. Any of the logical access statements of the present embodiment can create new objects in the IM diagram and in the IFM diagram.

In the preferred embodiment, "send" and "receive" statements are also available. The "send" statement defines the destination of information leaving a particular process. It can create an information flow from the process a user is currently editing to another process or source/destination. The syntax, or semantic rule, associated with a "send" statement is: SEND-(INFORMATION-STRUCTURE-REFERENCE)-WHERE (optional) - THROUGH (optional) - TO (optional). "Information-structure-reference" specifies the information to be sent from the process. The information can be a list of attribute references or an "entity.*" (indicating all attributes of a particular entity). An attribute reference can be an attribute name or a qualified attribute name. Optional clauses may include "where", "through", and "to". The "where" clause specifies search conditions that determine the information to send. The "through" clause specifies the information flow through which a user wants to send information. In one embodiment, only one information flow is allowed. The "to" clause specifies one or more processes or source/destination objects to which a user wants to send information.

The "receive" statement specifies the source of the information entering the process. It can create an information flow from a specified process or source/destination to the process for which a user is currently specifying PDL. The syntax associated with a "receive" statement is: RECEIVE -(INFORMATION-STRUCTURE-REFERENCE) - WHERE (optional) - THROUGH (optional) - FROM (optional). The "information-structure-reference" is the same as for "send" statements. Similarly, the "where" clause specifies search conditions that determine the information to receive, the "through" clause specifies the information flow through which a user wants to receive the information, and the "from" clause specifies the process or source/destination object from which the information is to be received. In one embodiment, neither the "send" nor the "receive" statements are allowed in entity method and derived attribute procedures. Both SEND and RECEIVE can create entities and attributes in the information model by reference. That is, if a user references an entity or attribute which does not exist, the system will prompt the user to create such an entity or attribute. Thus, similar to logical access statements, SEND and RECEIVE statements of the present embodiment can create new objects in the IM diagram and in the IFM diagram.

A SIGNAL statement may be used to signal an exception condition or error and to transfer control to a condition handler (WHEN clause) defined for the specified condition. A syntax for the statement is: SIGNAL—condition—(—expression list—). The "condition" is one of the system-defined conditions, including: ABORT, DUPLICATE, EMPTY, ONE, BEGIN, FIRST, LAST, EXIT, BETWEEN, END, END GROUP, SKIP, and, OTHERWISE. The system may test for and signal some of these conditions by default. An "expression-list" is a user-defined list of parameters to be passed to the condition handler.

A condition handler, such as WHEN, may be included to specify the action to take when a particular condition arises. This may be used in place of a user-written PDL statement to test for or signal that a condition exists. This may be used in conjunction with a SIGNAL statement to explicitly signal any of the system default conditions. Thus, as an argument to the SIGNAL statement, a user may specify the condition to be signaled and any parameters to be passed to the condition handler.

Two other important PDL statements are CONNECT and DISCONNECT. In general, these statements provide the means by which two instances of entities are caused to be joined at one of their partnership sets by a single partnership. The CONNECT statement may provide the means for causing a new instance of a partnership to be created joining two instances of a partnership set, each of which is associated with an instance of an entity. In the case of non-directed, recursive partnerships, the two ends of a single instance of a partnership must both be attached to the same instance of a partnership set.

In the preferred embodiment, when a CONNECT statement is executed, it is necessary to establish two sets of information; one set for each end of the partnership being created. In that instance, each set must include (1) identification of the type of entity and instance to be connected; (2) identification of the type of partnership set to be connected; and, (3) identification of the rules of insertion to be applied to the new partnership endpoint. These rules may include identification of the new partnership endpoint as the "first" member, as the "last" member, as the "prior" member to some designated current member, as the "next" member after some designated current member, sorted by some attribute value controlled by sorting rules, or in no particular order. Where the maximum cardinality is one, the rules of insertion are moot, as there can then be only one instance of a partnership endpoint at an instance of a partnership set at any moment in time.

The CONNECT statement may be an independent statement, or may be included as an extension of an INSERT statement. In the preferred embodiment, where the minimum cardinality is one (1) for one of the partnership sets, then the CONNECT statement must be treated as an extension of the INSERT statement to assure that the integrity of the partnership set is maintained after the INSERT is completed. In the situation where the minimum cardinality is one (1) for both partnership sets of the partnership, it may be necessary to actually INSERT both entities and CONNECT them before the information structure is in a consistent state. Where the minimum cardinality is zero for both ends of the partnership, or where the maximum cardinality is greater than one (1) for both ends of the partnership, it is essential that there exist an independent CONNECT statement which may add partnerships as they are required.

The DISCONNECT statement provides the means for causing an existing partnership to be destroyed. The destroyed partnership might be replaced by a new one, several, or none, depending upon the information situation.

Where it is essential to the integrity of the data definitions, it may be necessary that a RECONNECT statement be constructed as a separate command, or as a pairing of a DISCONNECT statement and a CONNECT statement to assure that the minimum cardinality rules remains intact. Where the order of the members of a partnership set is defined as being controlled by the values of one or more attributes, then the modification of the value of one of those attributes might require that the members of a partnership set be reordered to maintain the integrity of the declarations. The SORT statement may be defined to cause the members of a partnership set to be placed in a defined sequence on a batch basis, rather than on an ad hoc basis as they are created.

Other statements available in the illustrated system, plus a brief description, are listed below in TABLE 2.

TABLE 2

| PDL Statements | |
| --- | --- |
| ABORT | signals fatal error and rolls back all changes specified by the transaction |
| CASE | executes zero, one or more of several possible statement lists; compares several possible values to the value of "case selector" |
| COMMIT | transfers process results to information store |
| DO | calls an entity method or procedure from a process procedure, another entity method, or the same entity method |
| EXIT | used in iteration blocks to terminate the iteration statement and transfer control to the EXIT condition handler or to the statement following the iteration block |

TABLE 2-continued

| PDL Statements | |
| --- | --- |
| FOREACH | starts an iteration block, processing a single entity occurrence on each iteration until a specified condition is met |
| IF | makes the execution of a block statement conditional |
| LOOP | starts an iteration block, processing the statements within the block until a specified condition is met |
| NOTE | adds comments to a PDL specification |
| RESUME | used in condition handlers to indicate that the condition handler completed successfully, and transfers control to the statement following the SIGNAL statement that raised the condition |
| RETURN | exits from the process with a value |
| SKIP | terminates the current iteration and transfers control to the SKIP condition handler or to the next iteration of the block |

Other embodiments may have other statements which perform substantially the same functions as the CREATE, RETRIEVE, UPDATE, DELETE, SEND, RECEIVE, or other statements of the preferred embodiment described above. The description above is not intended to be semantically limiting, but merely to describe functions for affecting the modelers and associated design data.

The logic modeler 6 may be accessed from any of the other three modelers. In general, an IFM having the processes upon which the logic modeler 6 is to act must be opened prior to accessing the logic modeler. When a user creates or modifies objects in the IFM diagram 50, the system 10 automatically creates or modifies the corresponding PDL statements and their graphical representations. For example, if an information flow is created from a source/destination object to a primitive process and the contents of the information flow in the IFM diagram 50 are defined, the PDL diagram 100 for that (nodes are described in detail below). The "receive" node represents a PDL statement that describes the source of information coming into the process.

In a similar manner, when PDL objects are created or modified, the system creates or modifies the corresponding objects in the IFM diagram 30. For example, any of the PDL logical access statements can create a new entity in the IM diagram 50 or a new information store in the IFM.

The PDL diagram 100 may also include graphical representation of the process description, and may enable a user to generate a report containing the text of a process description. In the preferred embodiment of the system 10, the graphical representation is in the form of a tree structure diagram, shown in FIG. 8. The tree 100 may have a series of nodes 102, pins 104, and PDL statements 106. The nodes 102 appear as boxes on the tree structure diagram 100. The nodes 102 contain text fields, upon which statements from the modelers or from internal language statements, appear.

Figures 1, 2, 3, 4, 5, 6, 7, 8, 9, 10:
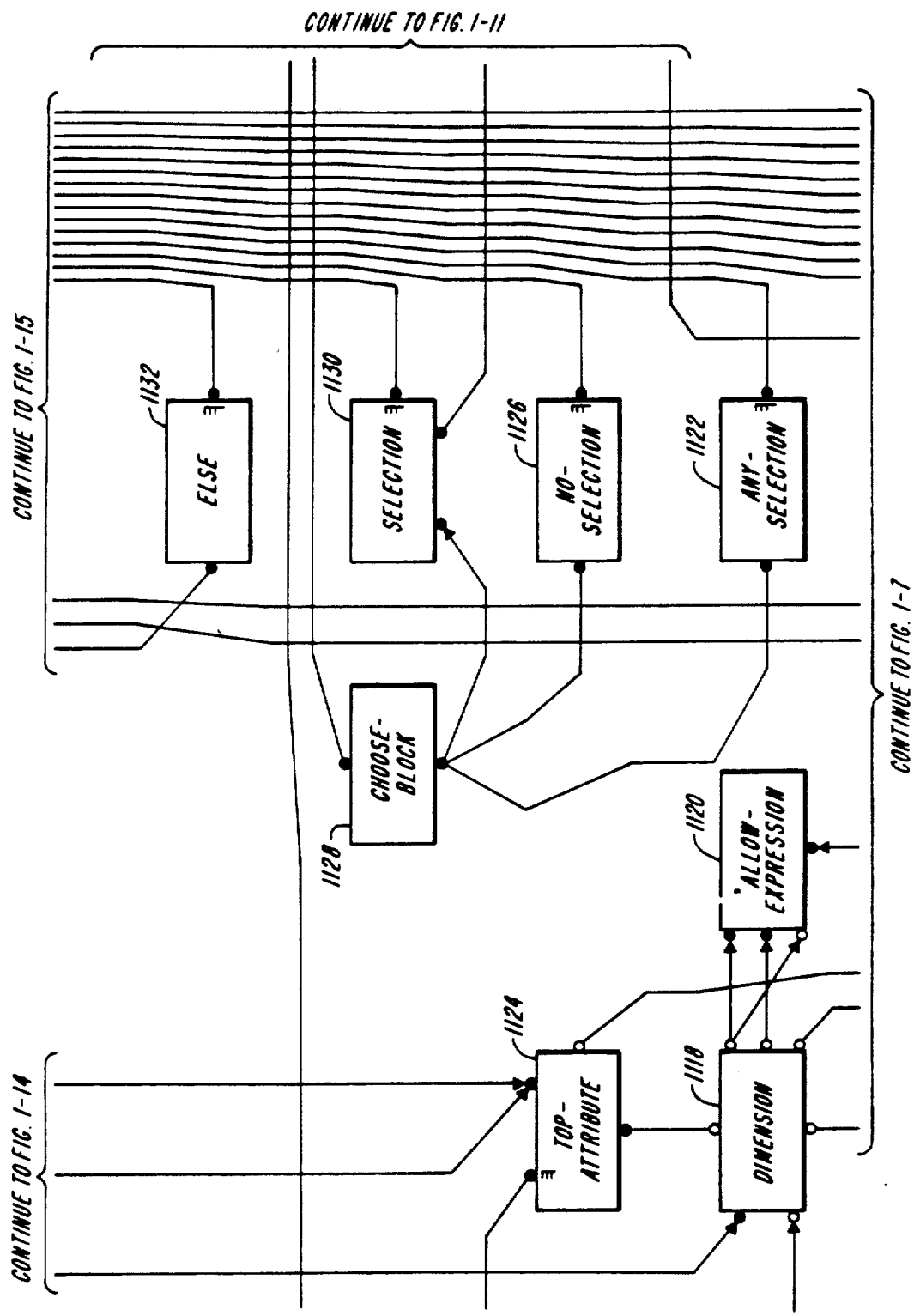
Figures 1, 2, 3, 4, 5, 6, 7, 8, 9, 10, 11, 12:
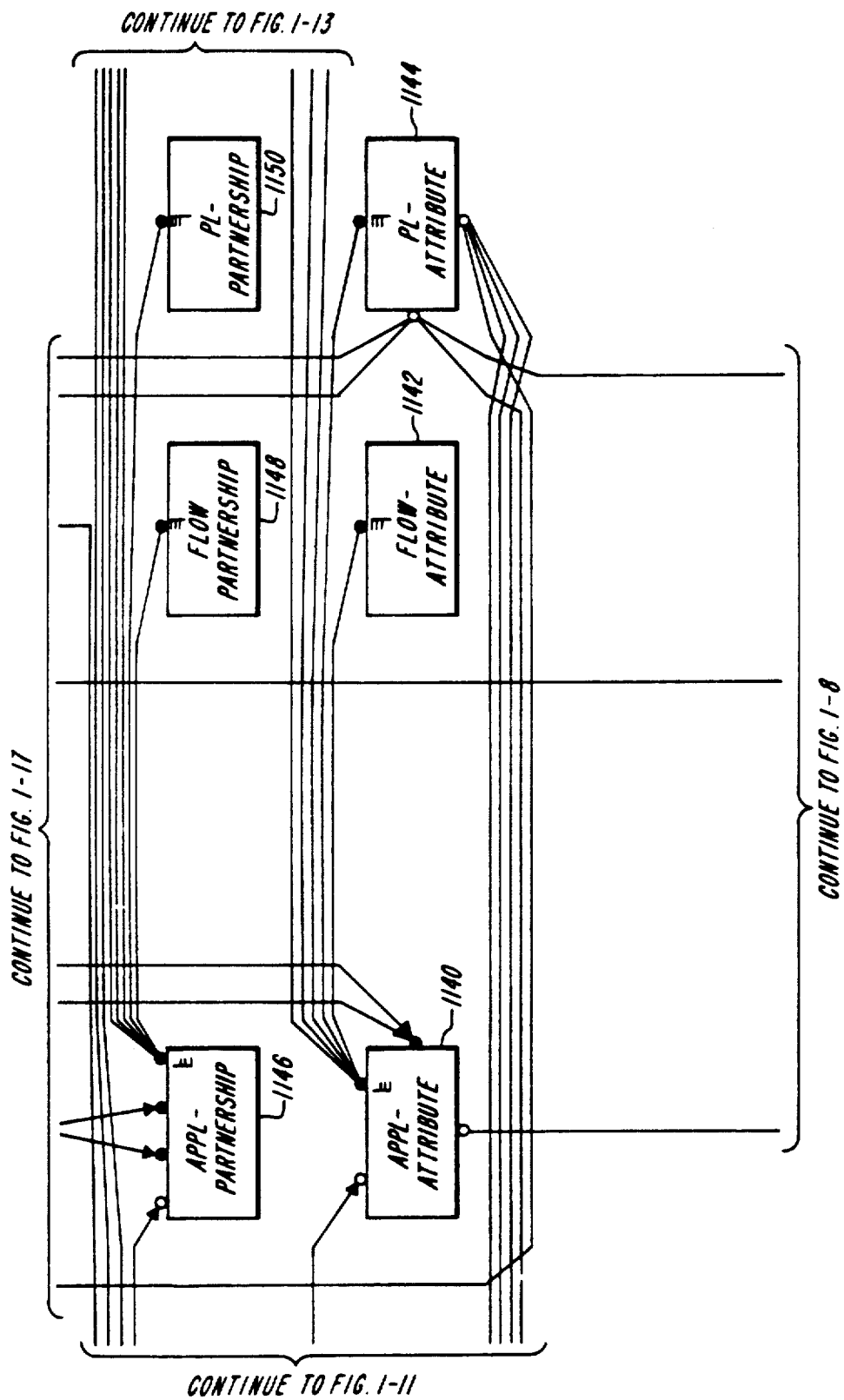
Figures 1, 2, 3, 4, 5, 6, 7, 8, 9, 10, 11, 12, 13:
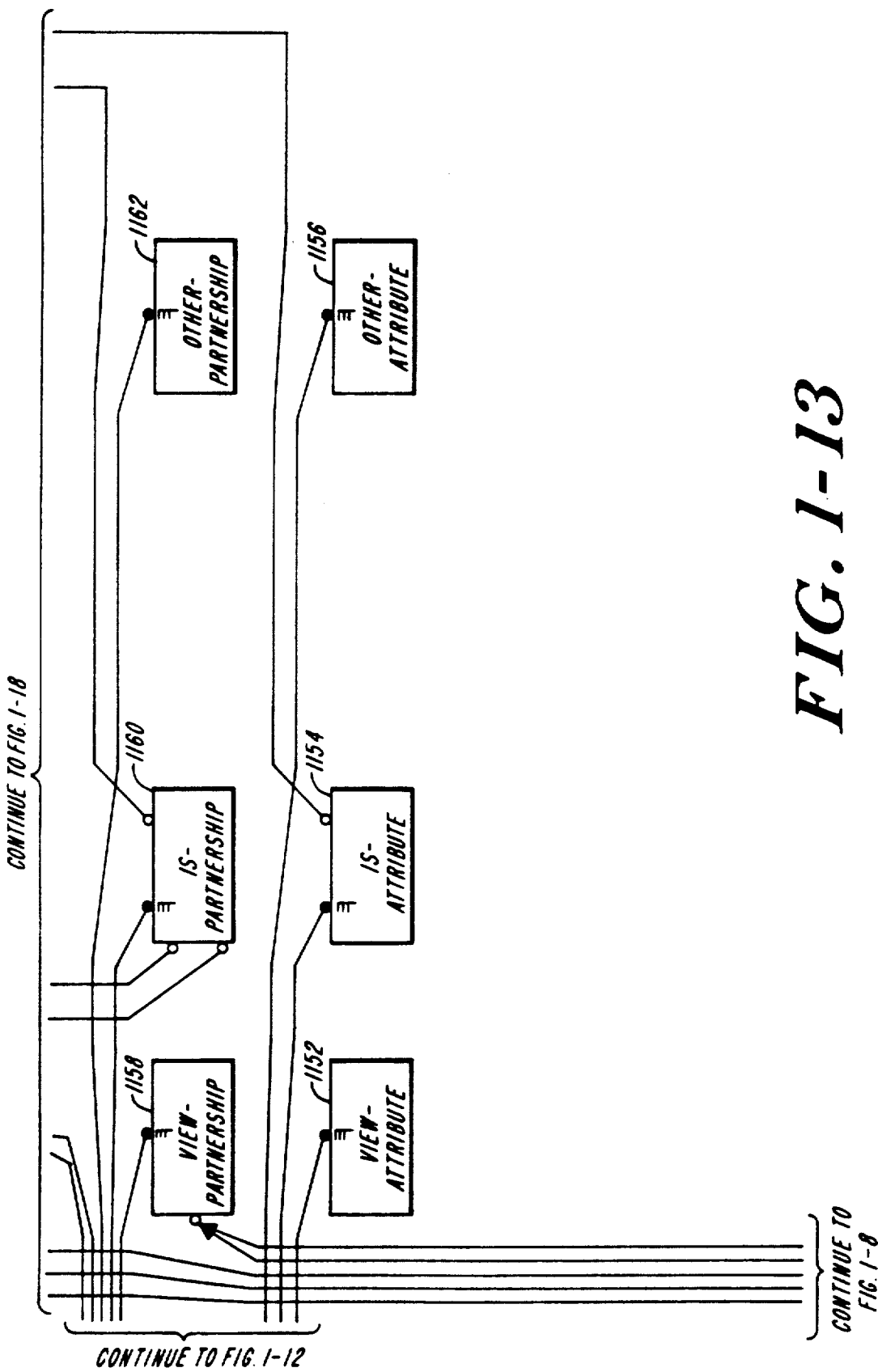
Figures 1, 2, 3, 4, 5, 6, 7, 8, 9, 10, 11, 12, 13, 14:
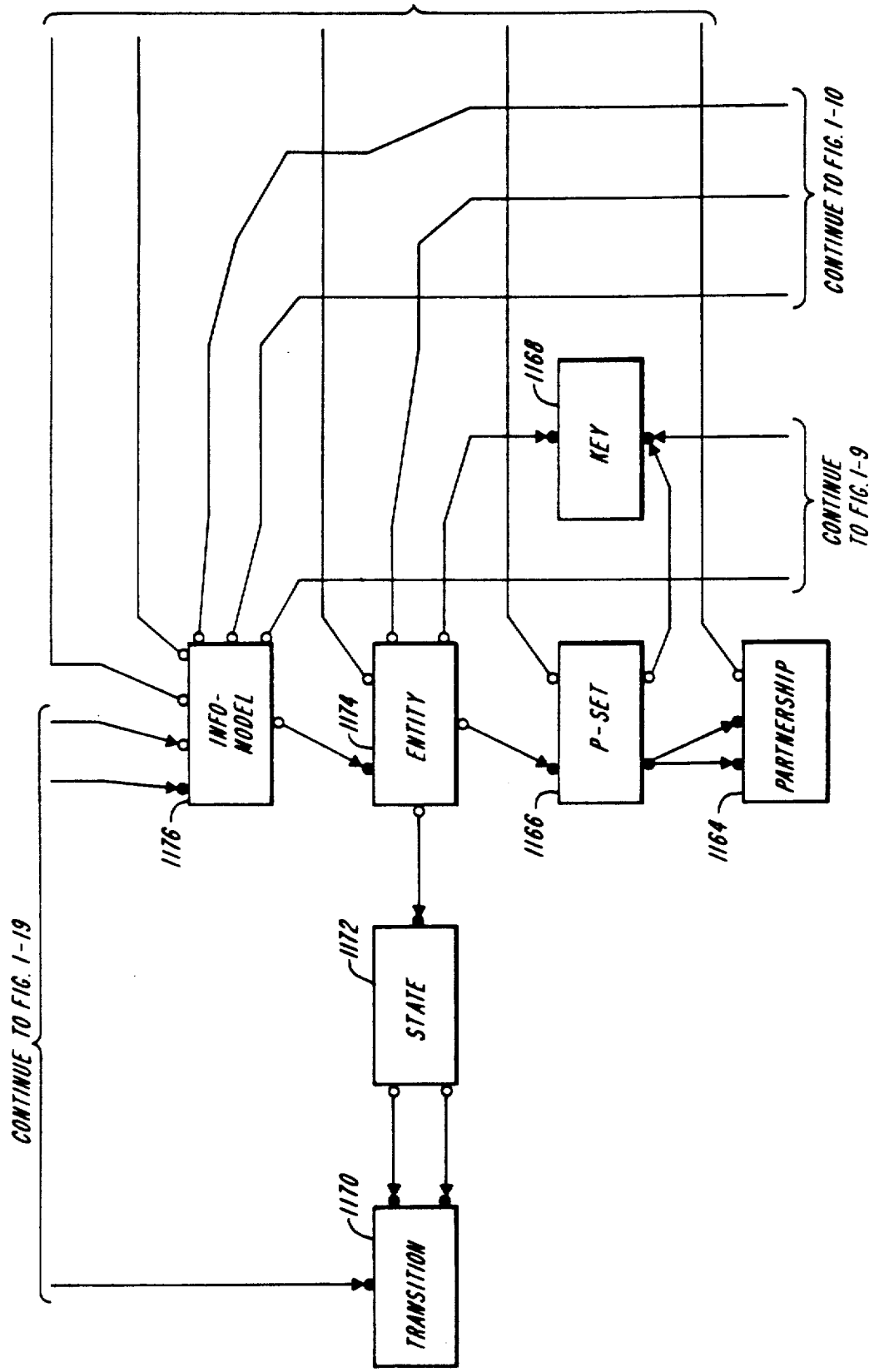
Figures 1, 2, 3, 4, 5, 6, 7, 8, 9, 10, 11, 12, 13, 14, 15:
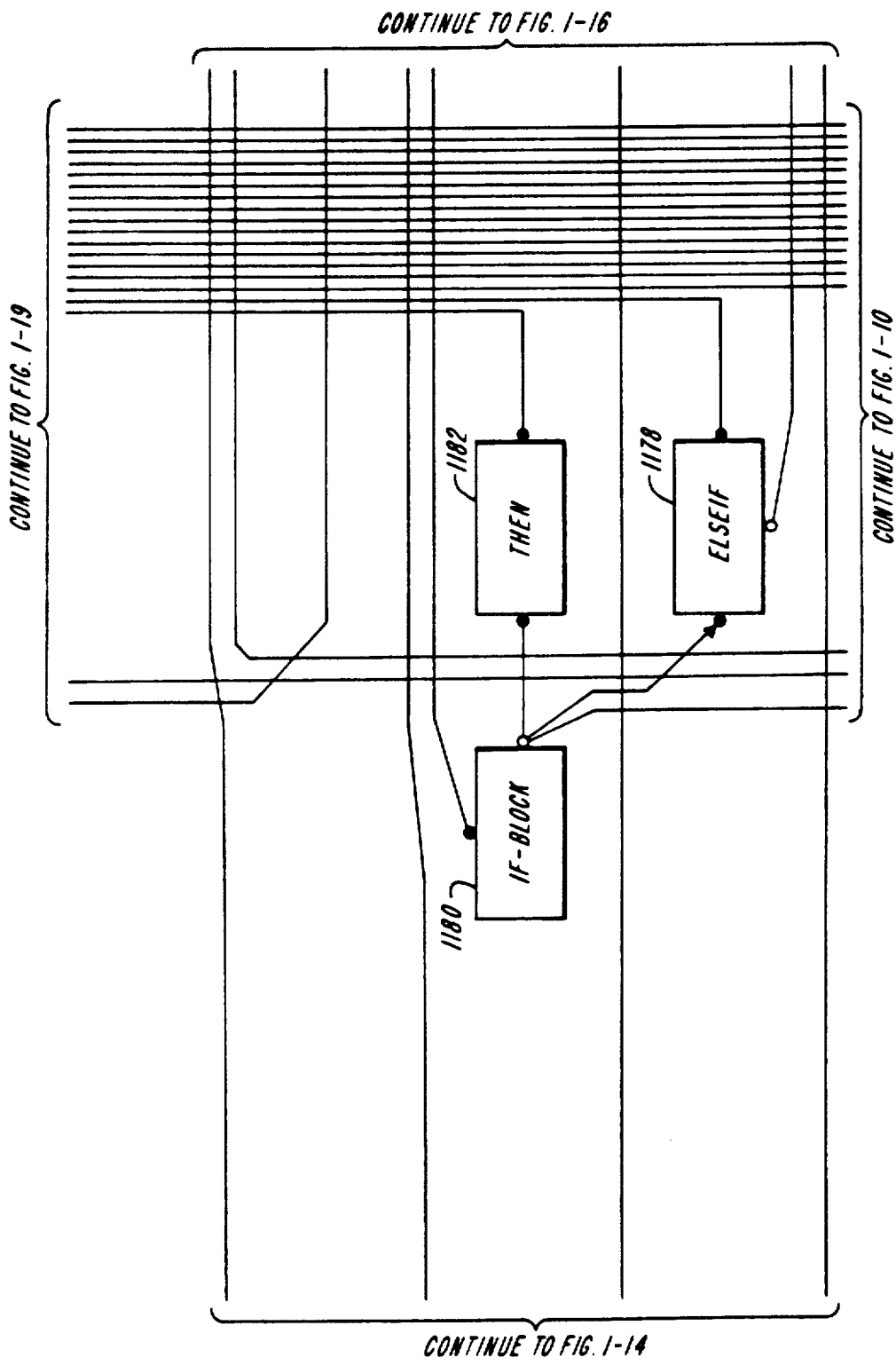
Figures 1, 2, 3, 4, 5, 6, 7, 8, 9, 10, 11, 12, 13, 14, 15, 16:
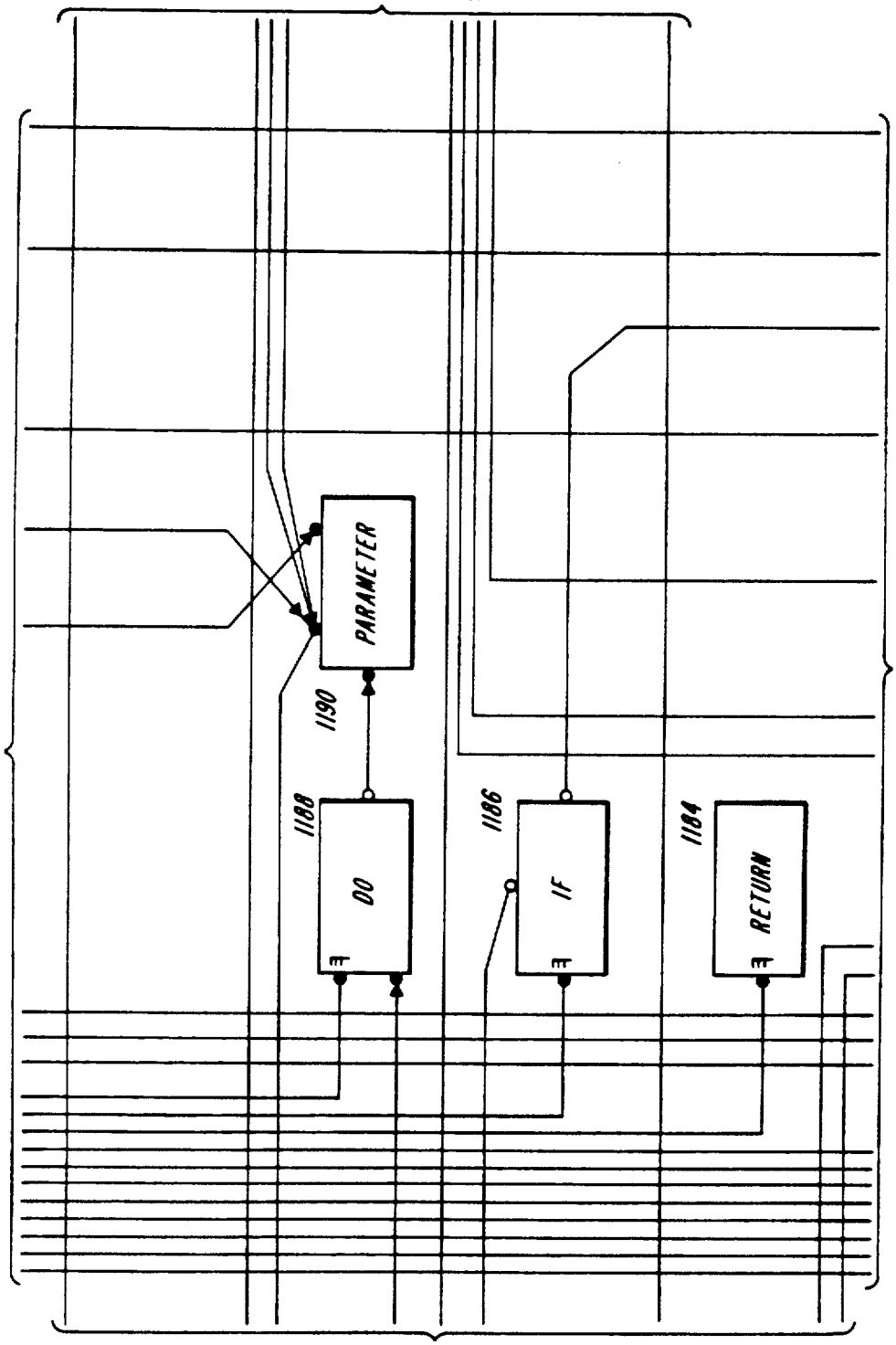
Figures 1, 2, 3, 4, 5, 6, 7, 8, 9, 10, 11, 12, 13, 14, 15, 16, 17:
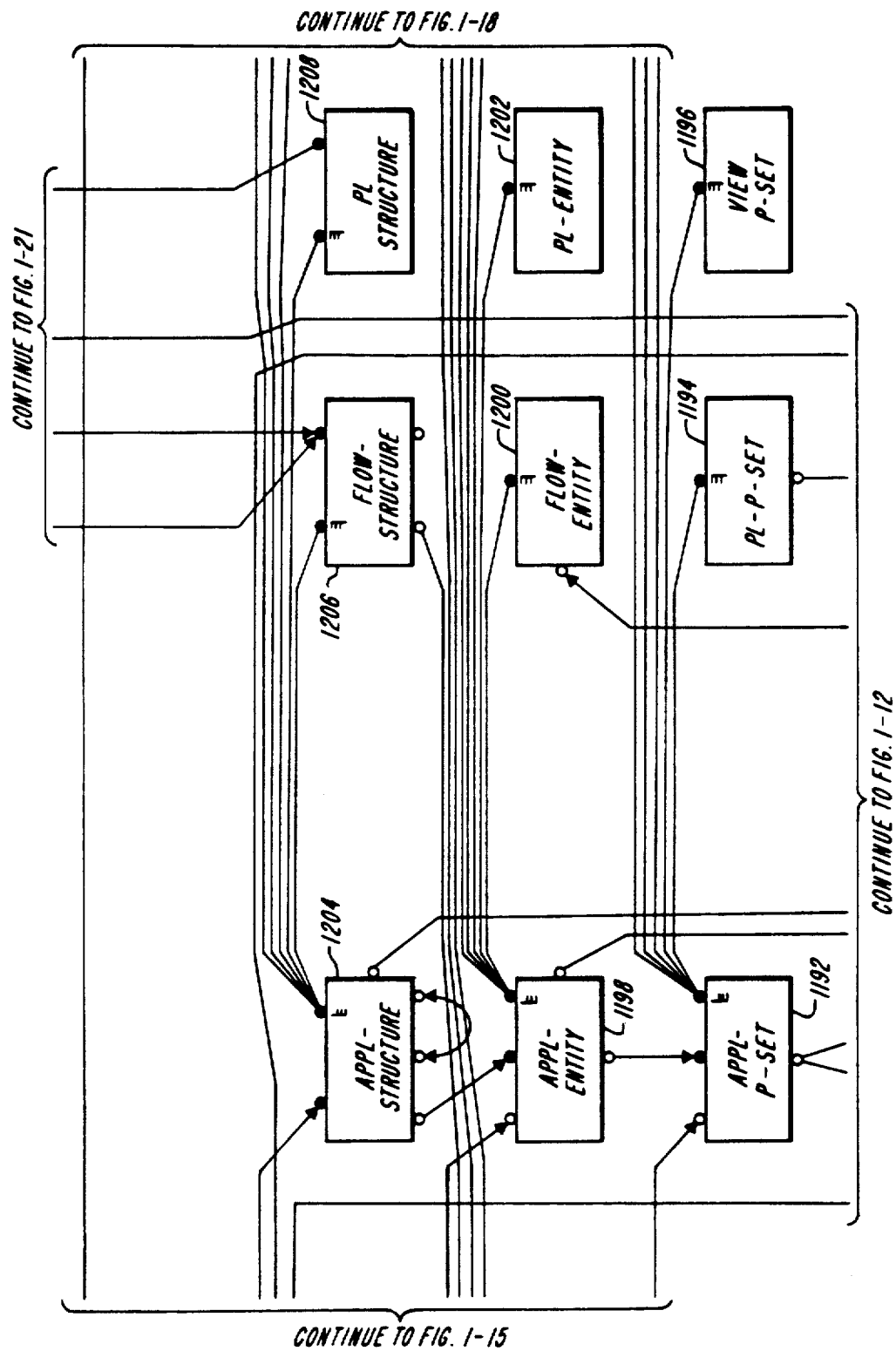
Figures 1, 2, 3, 4, 5, 6, 7, 8, 9, 10, 11, 12, 13, 14, 15, 16, 17, 18:
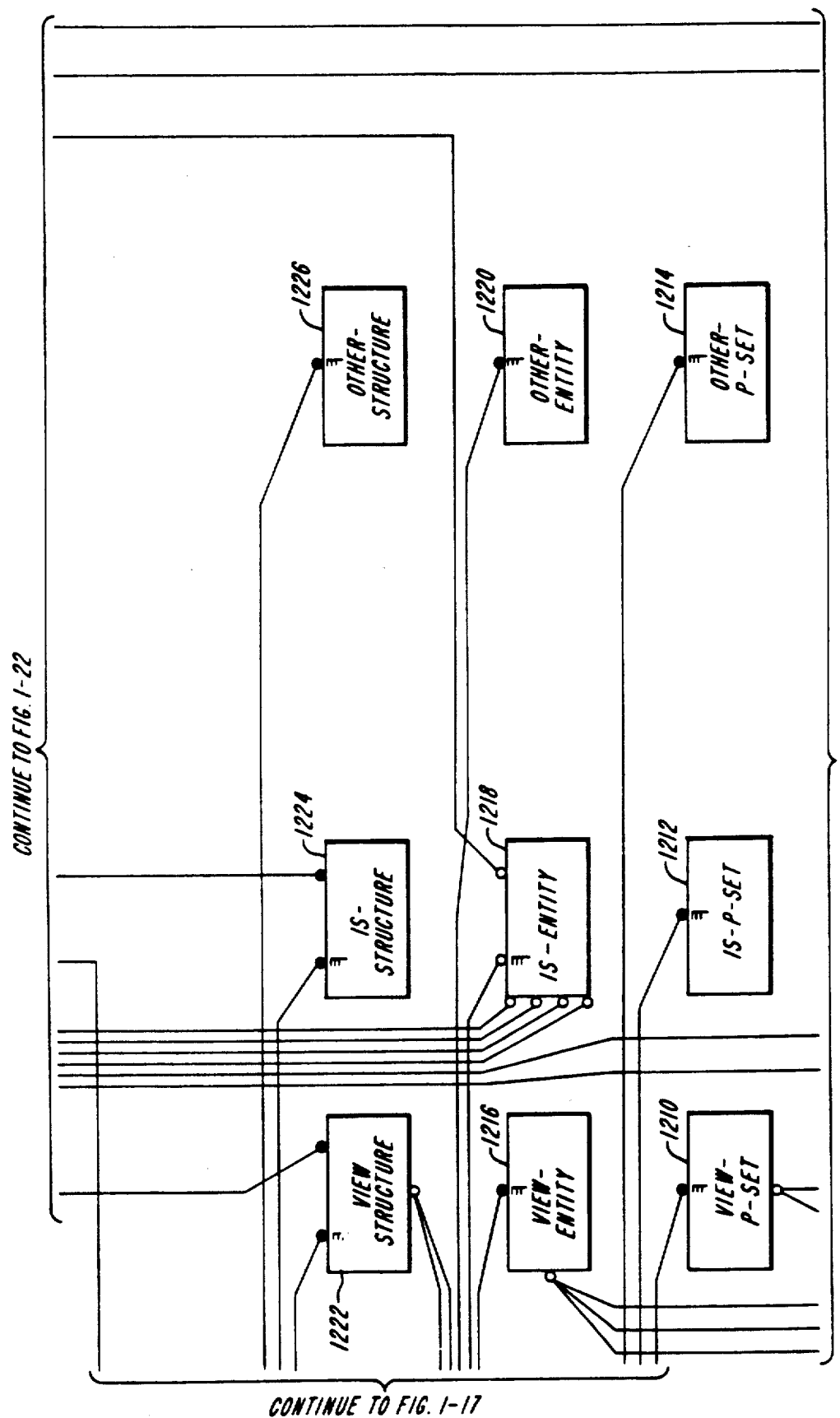
Figures 1, 2, 3, 4, 5, 6, 7, 8, 9, 10, 11, 12, 13, 14, 15, 16, 17, 18, 19, 20, 21:
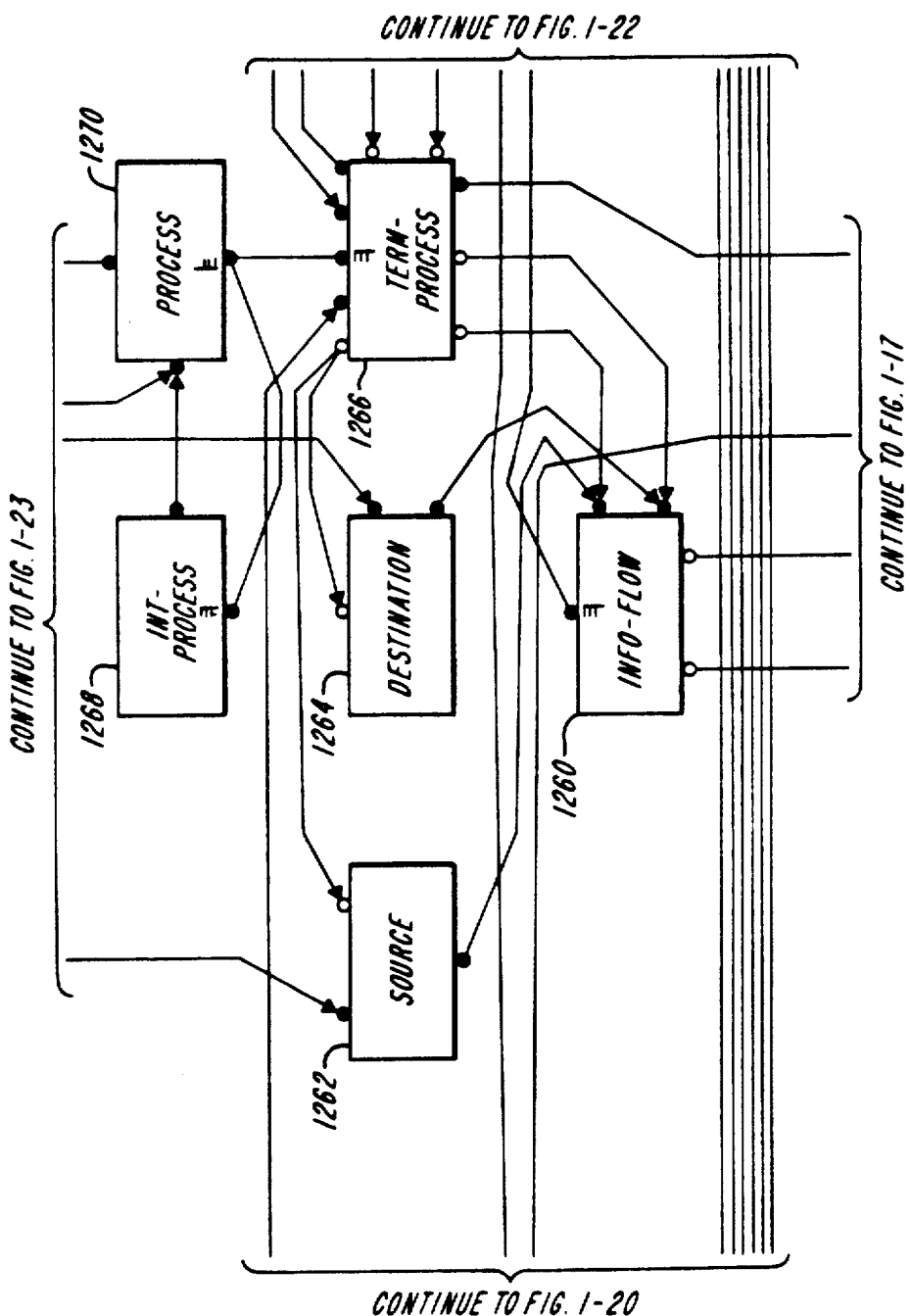
Figures 1, 2, 3, 4, 5, 6, 7, 8, 9, 10, 11, 12, 13, 14, 15, 16, 17, 18, 19, 20, 21, 22:
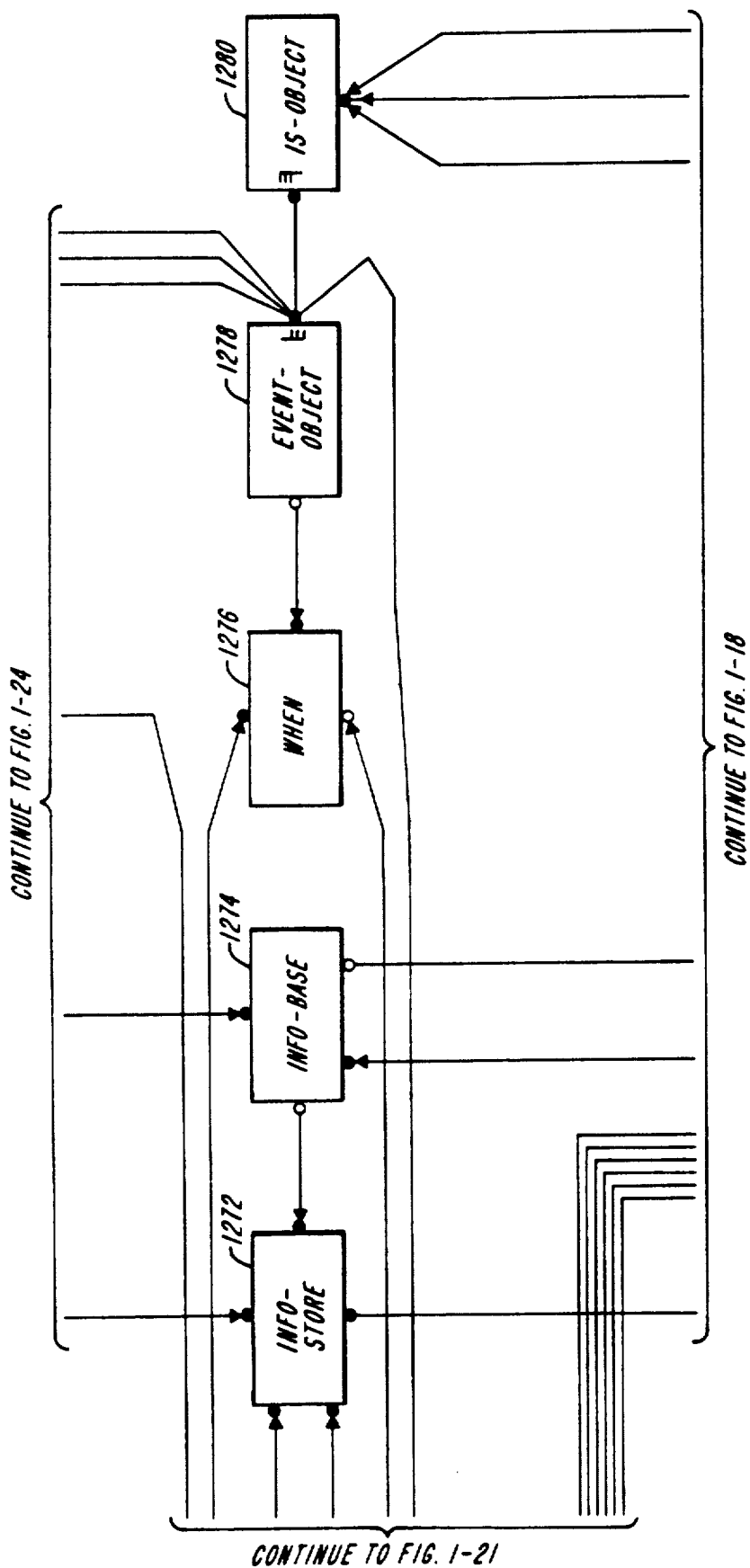
Figures 1, 2, 3, 4, 5, 6, 7, 8, 9, 10, 11, 12, 13, 14, 15, 16, 17, 18, 19, 20, 21, 22, 23:
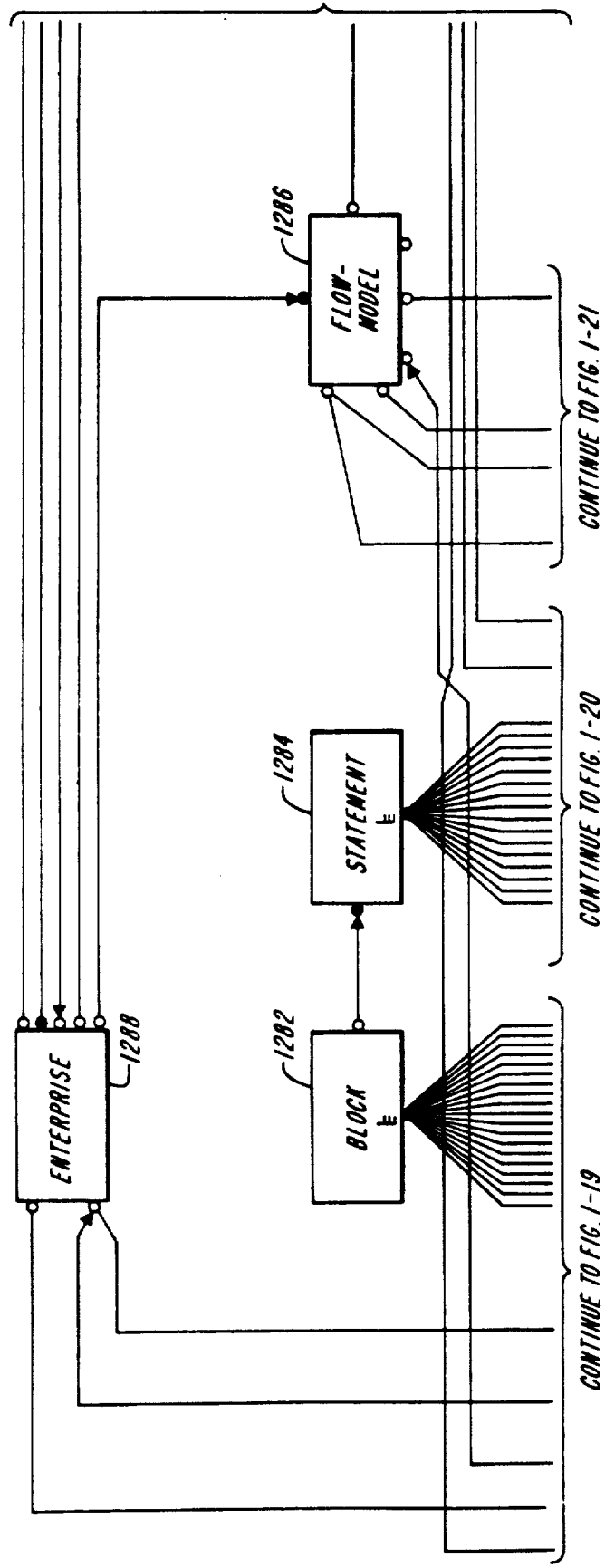
Figures 1, 2, 3, 4, 5, 6, 7, 8, 9, 10, 11, 12, 13, 14, 15, 16, 17, 18, 19, 20, 21, 22, 23, 24:
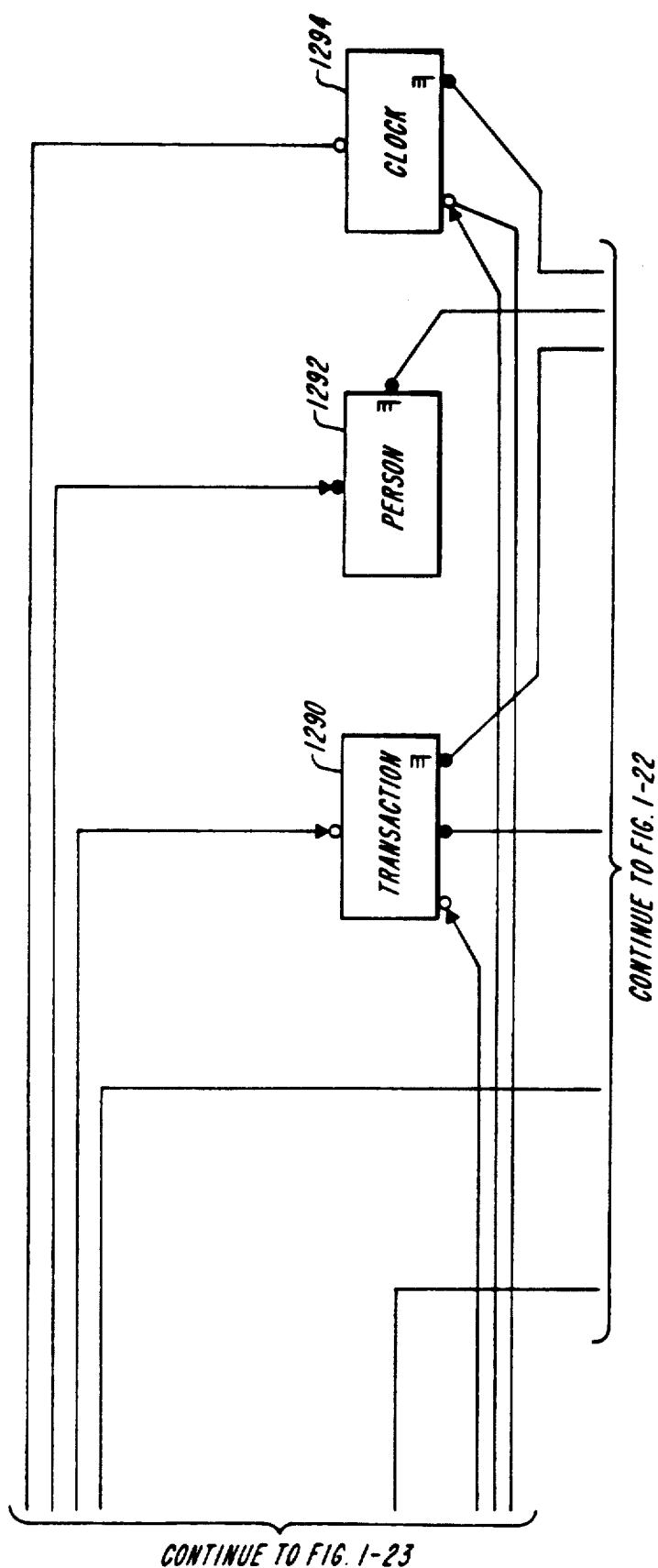
Figure 2:
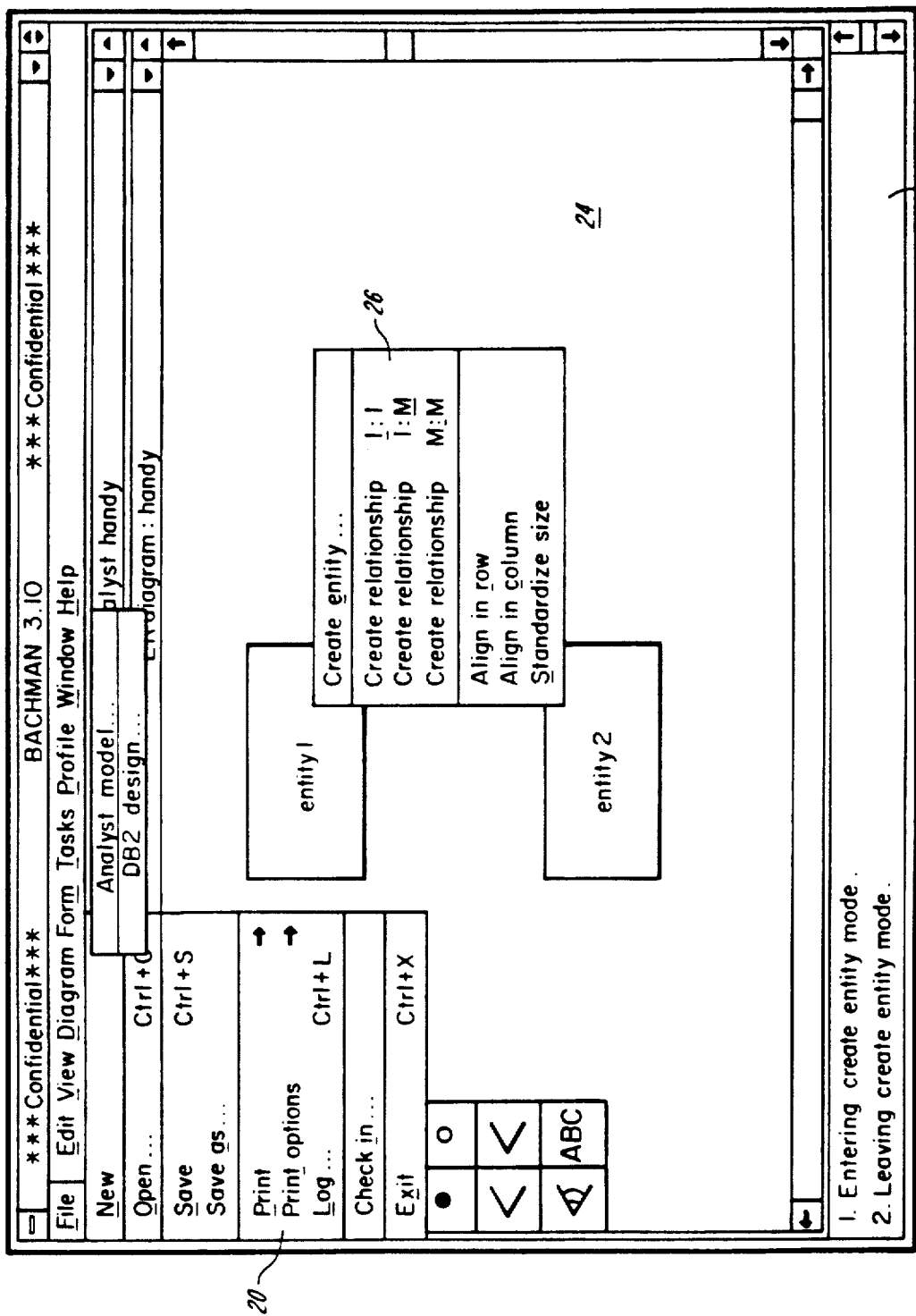

Pins 104 represent the relationship, or link, between statements or parts of statements. The position of a pin 104 in relation to its node 102 indicates the type of pin 104 it is. As best shown in FIG. 9, pin types may include: extension pins 112; root pins 114; parent/child pins 116; qualifier pins 118; and condition pins 120. An extension pin 112 may be used to mark each location where an operator can add nodes 102 to the end of an existing sequence. An extension pin 112 may appear at the end of a main line 108, or at the end of each line that represents a subsection of a process description. A root pin 114 may be used to mark the location, or root, of a node 102. Selection of a root pin 114 by an operator enables the operator to insert nodes 102 before the root pin 114. A root pin 114 may appear along any line of a process description. A parent/child pin 116 may be used to mark the beginning of a subtree of nodes, and allows a user to insert nodes 102 at the beginning of a subtree. A qualifier pin 118 may be used to represent a clause 118a that modifies a PDL statement 106 contained in an associated node 102. A condition pin 120 may be used to represent directions for handling exception conditions and errors associated with statements in a node 102. An important aspect of the nodes/pins relationship is that each pin 104 is associated with at least one node 102, and is graphically represented as such.

In general, each node 102 and its attached pins 104 represent a PDL statement 106. Pins 104 may also have active or inactive, and may be displayed to the user independent of its status. A pin 104 having active status is defined as a pin 104 which acts upon the associated node 102, whereas a pin 104 having inactive status is defined as a pin 104 which merely represents the possibility of becoming active upon user input.

The logic modeler 6 may have a series of windows associated with it which are unique to the logic modeler. These windows may be similar to those used in the other modelers, but may only reflect activities within the logic modeler and associated logic model.

PDL statements and their graphical representations can be created either by being generated by the system 10 from objects in the corresponding IM and IFM, or entered directly by the operator. The graphical representations may be in the form of a tree structure diagram 100, a network diagram (not shown), or other forms customary in the art, which may be displayed in a diagram window 24. In the preferred embodiment, a node 102 representing the scope of the description occurs at the top of each PDL diagram 100. The node is generated by the system 10 to describe the process for which the user is specifying a logic modeler 4. All possible qualifier pins 11B and a condition pin 120 appear on the node 102 independent of whether a user has actually entered them as part of the statement. In the preferred embodiment, if a qualifier pin 118 is active, i.e. actually part of the statement, the text of the clause represented by the pin 118 appears to the side of the pin 118. If a pin 103 is not active, it serves as a place holder, telling the user that a clause may be added to the statement.

Addition or modification of design data, or objects, in the PDL diagram 100 may be achieved by establishing an editing focus, which may be user-selected and system activated. An editing focus may be a pin 104 to which the user wants to add a node 102, or it can be a node 102 or pin 104 the user wants to modify. When a new node 102 is added to the end of a IM tree of a PDL diagram, the logic modeler automatically creates a new pin 112 that extends from the new node. This extension pin 112 then becomes the editing focus. An operator can easily change this editing focus by selecting another object in the displayed PDL diagram 100.

In the preferred system, the logic modeler may also include an options modeler and related options windows which present items available for the operator to use in building PDL statements 106 and manipulating PDL diagrams 100. An exemplary option Window 150 is shown in FIG. 10. The options modeler is a language sensitive editor which generates a display of syntactically valid options for insertion by the user at a selected point in a line of a procedure, specification, or statement. The options window shows only those terms and/or phrases which are syntactically valid for building PDL statements, and thus may be displayed as a PDL palette as shown in FIG. 10.

The syntactic validity of an option is determined by comparing the options available, to criteria which may be defined by logical relationships, general semantic rules, expert rules, and heuristics. Logical relationships may include requirements such as certain keywords must be used in conjunction with specific identifiers. General semantic rules may include requirements that two keywords cannot occur next to each other without intervening identifiers. Expert rules and heuristics may involve series of user-defined logical correlations which must occur before a PDL statement structure is considered correct.

In the illustrated embodiment, the options window 150 is a tree-like display of items that a user can use to build PDL statements. These items may include keywords, symbols, identifiers, and the names of objects in the corresponding IM diagram 30 and IFM diagram 50. When the logic modeler 6 is first displayed, a single PDL palette 152 appears in the options window. Once a user selects an editing focus, the PDL palette item expands to display one or more categories of the PDL grammar. For example, when a user sets the editing focus to an extension pin 112, a root pin 114, or a parent/child pin 116, the following items appear in the options window: verbs, control flow, qualifiers, NOTE. The first three items are categories of the PDL grammar. The fourth item is a PDL keyword that can be used to add comments to procedures.

In other systems, an option modeler may be used in conjunction with any of the modelers, or editors, in designing and building a model.

Additional Aspects of the System (1) Dynamic Linking

An important aspect of the present system is a dynamic linking between the design data sets of each modeler. Within the logic modeler, when design data is created or modified in the information modeler or process modeler, the system automatically creates or modifies the corresponding PDL statements and their graphical representations. For example, if an operator creates a source/destination design data, or object, with an information flow to a primitive process in the IFM, the PDL diagram 100 for that primitive process contains a node 102 labeled RECEIVE. The RECEIVE node represents a PDL statement that describes the source of information coming into the process. In a similar way, when an operator creates or modifies PDL objects or design data in the logic modeler, the system creates or modifies the corresponding design data in the IFM and/or IM.

The dynamic characteristics of the system of the invention may be achieved by use of partnership sets. As best described in U.S. Pat. No. 4,631,664 (Bachman, 1986), partnership sets may be used to control storage, retrieval, and modification of information in a design data collection contained in storage devices in a design data processing system. In the present system, Partnership sets are used to handle complex information sets, as described above.

(2) Dynamic Text and Graphics

In addition, each of the modeler displays may include text having a combination of icons and alphanumerics. The text may be dynamic, such that a user may affect IM design data, IFM design data, FD design data, and PDL design data by interacting with either the icons or alphanumerics. Since the present system is a primarily graphics system enabling an information system user to create graphic models of complex information systems, the ability to use dynamic icons and alphanumerics may be an important feature of such a system.

(3) Diagnostics

Further, the system of the invention may include an internal diagnostic or consistency check which signals to a user when improper terminology is used. Certain processes, semantic rules, logical relationships, expert rules, heuristics, text fields and pins may be stored in a database storage. When a user creates, modifies or adds design data in any of the modelers, the present system will check those statements against internally-stored design data. If the input design data does not correspond to the predetermined design data, the improper design data is "flagged" by the system and appropriate flag signals are displayed to the user.

In addition to being a double-check system for syntactic and semantic correctness of statements, the signals may be a part of an iterative process performed within the system. In the preferred embodiment, a design task may be included which is an intelligent, rule-based task that automates the repetitive process of examining and modifying the information model. The design task may include expert rules and heuristics against which statements and procedures are checked.

In the illustrated embodiment, the design task works in the following series of steps: (1) using a built-in set of design rules, the design task searches that information model for objects that might be more complex than necessary; (2) it then displays a list of those objects and actions that might simplify those objects; (3) the user then decides what action to take next, which may be either selecting an action that modifies one or more of the objects, or marking one or more of the objects as correct, thus indicating that the rule is inappropriate for the Particular object; and, (4) the user then decides whether to rerun the same design rule, or to run the next rule.

(4) Filters

A user may also define and implement filters. A filter allows a user to view and operate on a subset of a model. The objects that are included in a subset, or filtered model, are determined by selection criteria defined by a user when the filter is created. In the preferred embodiment, multiple filters may be created for the same model, however only one filter can be active at a time. For example, if a user wants to display objects created by a specific user and also display objects of a certain type, two filters can be defined, each including those respective objects. Both of these filters would be applied to the same original model, but they would each produce a subset of that model.

When using the filters, if a diagram is displayed when a filter is activated, the filter takes effect immediately. That is, all objects which do not meet the selection criteria of the filter are automatically cleared from that diagram. It may be possible to implicitly include objects when an object is explicitly selected to be included in a filtered model. For example, if an information flow is the selection criteria of the filter, the objects that are the source and destination of that flow are implicitly selected, but not associated subordinate objects, such as flow structures. Similarly, when a diagram of a filtered model is displayed, objects that meet the filter selection criteria are displayed, along with any objects upon which their existence may depend.

(5) Process Description Language (PDL)

The system of the present invention enables a user to describe the elements and concepts most important to a business organization. Building a model of complex organizations facilitates the communication of vital business functions among the many departments of an organization. In the preferred embodiment, PDL enables a user, in a specification/design mode, to specify business logic for a model. Objects and processes (i.e. PDL design data) are specified and/or defined. In an execution mode, PDL enables a user to manipulate instances of objects and processes of the model. Such objects and processes, in both modes, include entities, attributes, processes, messages, and relationships. In both modes, the processes may be independent processes, or cooperating processes which are focused upon the successful processing of individual "business transactions".

The transactions specified by PDL are business transactions which are declared to be indivisible elements. The PDL essentially enables the system to assure that a user is working with such indivisible elements by providing a means for defining pieces of discrete business processing. The business world, or environment of an organization, can thus be defined in terms of discrete transactions which are known and either processed or not processed. In a model for complex organizations defined in terms of business transactions, or indivisible elements, validity checks need to be performed each time an instance of an object or process is manipulated or a process is defined. To do so, user data is effectively maintained in a static form until the specific transaction either becomes "successfully" or "not successfully" processed.

The business transactions related to the processes specified by the PDL are thus indivisible elements of work which are to be treated by the business as being in one of four states: waiting to be processed; in process; completely and successfully processed; or, completely and unsuccessfully processed. In the preferred embodiment, the rules expressed by the PDL for one business transaction can only either specify access to information in an information store that has been placed there by completed other business transactions, or specify receipt of messages from completed business transactions. During its processing period, i.e., in the execution mode, the PDL enables the storage of new information in the information store, and the sending of information intended for other processes. Moreover, the stored information will immediately be available to processes cooperating on the same business transaction. In the case of an unsuccessful process, it may make changes to the user data, and send messages reporting an unsuccessful transactions after its prior actions have been undone. Processes working on other business transactions will not be able to access the new information, nor will the processes be aware of the generation of the messages until after the source process has either successfully terminated or declared that it has been aborted.

Thus, in execution mode, the present system with PDL enables a user to manipulate instances of objects and processes within a model. That is, the user data is essentially put into a static state during which operations are, in effect, reversibly performed without affecting existing instances of objects or processes. That is, changes to the user data are performed in "quarantine", and are not incorporated into the user data until the process is determined to be (in accordance with criteria or algorithms defined by the PDL design data), and reported successful or unsuccessful. A user-specified process may then abort the action without side-effects to the existing user data, or commit the action. This is analogous to having a master "undo" command which retrieves data deleted, but temporarily stored, in an application. The changed user data may be made accessible for processing in conjunction with other business transactions.

In the preferred embodiment, a PDL an ITERATOR statement may be a major block of a program, having a number of nested blocks. Each nested block contains the logic to be executed under a designated circumstance or set of circumstances.

(6) Entity-sets

The system of the preferred embodiment may also include entity-sets. In the specification mode, entity-sets are defined in terms of references to entity types and conditions. In the execution mode, an instance of an entity-set contains references to a list of entity instances, which are then treated as a value. Thus, in the execution mode, entity-sets may be assigned to a variable or to the attribute of an entity, or may be used as an operand. For example, such entity-sets may be the operand of an ITERATOR statement.

An entity-set variable provides the means for storing and accessing a list of references to entity instances. In the execution mode, this collection of references is ordered, i.e., there is a "first" reference, a sequence of "next" references, and finally a "last" reference. The sequence of references is preserved, unless some explicit action is made to reorder that set. New references may be added to, deleted from, or rearranged in the list. It may be possible for one entity instance to be referenced in an entity-set more than once, however explicit action may be used to hide duplicate references to a single entity instance. The type of entity instances referenced within an entity-set may be of the same or different entities.

An entity-set is a generalization of the partnership-set of the partnership data model. It takes the properties of a partnership-set expressed as a particular property of an entity and characterizes it as a holder of a list of entity references. These properties are transfered to a new type of data variable, which is not necessarily identified with a particular entity. The assignment of a list of references from a partnership-set has the effect of transforming that list from a dynamic list, responsive to the creation and deletion of partnerships between the subject partnership-set and other partnership-sets, into a static list subject only to explicit commands addressing that list.

Generally, data variables are named storage structures, where each data variable is specialized to handle particular types of data. In the present embodiment, during operation in the specification mode, an operator may declare a variable to be an entity-set variable; during operation in the execution mode, a user data value may be assigned to an entity-set variable Thus, this leads to a new type of data variable, i.e., one that can store and return the values which are references to entity instances. In the preferred embodiment, an entity-set has three basic states: empty (i.e., the entity-set has no members): not-empty (i.e., the entity-set has a list of one or more entity references): and, undefined (i.e., no entity-set, either empty or not empty, has been assigned to the data variable). The undefined state may appear initially after the data variable has been established but before any value has been assigned to it. The undefined state may also arise subsequent to a data variable being nullified.

The association of data variable with a data type entity-set enables the separation of the idea of the set of entity instances associated in partnership with a partnership-set, from the act of iterating over the list of entity instances of a partnership-set to perform the actual processing of those entity instances. In the preferred embodiment, a SELECT statement may be used to assign an entity-set to a data variable, and to hold that entity-set value until it becomes appropriate to take some action against the set of entity instances referenced by the entity-set value.

Establishment of entity-set data types enables the identification of data variables, including those which are process-local variables, as well as those attributes of entity instances which may be defined, as having the data type of entity-set. Further, any operation which may be performed upon an entity instance may also iteratively operate on a set of entity instances by referencing a variable of the type entity-set. Specifically, within the logic modeler of the preferred embodiment, PDL statements may act upon entity-set variables. Operations may also involve two or more entity-sets. For example, entity-sets may be merged, concatenated, compared, joined, and tested for the inclusion of one within the other, or the exclusion of one from the other.

While, in the preferred embodiment, PDL is used to manipulate business transaction design data, other embodiments may use mechanisms independent of the PDL of the present system. Business transaction design data may correspond to transaction-related information, such as rules of transactions which operate on entities, attributes, and relationships. These rules may include processing algorithms, and may be stored internal to a computer system. User data may then be transformed in accordance with the transaction design data.

The user data of the entire business transaction model described above may be held in an externally perceived static state, while that data is effectively internally transformed in a reversible manner. The discrete elements of the user data of a business transaction may be tested against the existing user data without making externally perceived changes to the existing user data. Once the internal check is complete, in accordance with the predetermined algorithms, external signals may be sent by a user to either commit (if "successful") or abort (if "unsuccessful") the changes to the user data. Subsequent to the abort signal and the reversal of prior action on the user data and messages, the process may make changes to the user data and send other messages that are relevant to the unsuccessful transaction (e.g. indicative of the unsuccessful processing). The changed user data then becomes fully externally accessible.

The specification, or outcome, of the system described above, may be converted into code and implemented to produce a working application system. That conversion may be accomplished manually, or under the control of a programmed digital computer. This specification, or outcome, is preferably in terms of PDL statements similar to those discussed above and as listed in Table 2.

A complete printout of the object code for the system described in detail above is set forth in U.S. Pat. No. 5,146,591, incorporated herein by reference.

A manual describing a preferred embodiment of the present system is set forth in U.S. Pat. No. 5,146,591, incorporated herein by reference.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What we claim is:

1. A computer system for establishing model subsets of a dynamic model of information systems of organizations, comprising:
    A. two or more modeler subsystems including modeler means for creating, analyzing, and modifying two or more models corresponding to each of said modeler subsystems, each of said models having design data representative of elements including at least one from the group consisting of: attribute; entity and attribute; attribute method; entity and relationship; entity method, entity and entity method; entity, relationship and partnership set; process; view; process local store; information store; information flow; message; source; and, destination;
    B. operator means coupled to each said modeler subsystems for applying external signals to each of said modeler subsystems, said signals being effective to evoke a creating, analyzing, or modifying response from at least one of said modeler means;
    C. modeler linking subsystem (MLS) coupled to each said modeler subsystem, said MLS including means for dynamically correlating said design data, whereby a change to any of said design data of one of said modeler subsystems affects a substantially immediate corresponding change to said design data of others of said modeler subsystems; and
    D. filter means coupled to at least one said modeler subsystem for creating a model subset, said model subset being defined by operator-determined selection criteria, and being selected in accordance with said selection criteria from each of said design data, wherein said filter means further comprises means for establishing a model subset display of said model subset, and having model subset display objects representative of said model subset, including means associated with said model subset display selectively operative for externally applying signals to each of said model subset display objects, whereby an externally applied signal associated with at least one of said model subset display objects affects an associated one of said models.

2. A computer system according to claim 1 further comprising a display linking subsystem coupled to said modeler subsystem, said display linking subsystem including means for dynamically correlating each of said model subset displays, wherein a change to any of said model subset design data affects a substantially immediate corresponding change in others of said model subset design data.

3. A computer system for establishing model subsets of dynamic model of information systems of organizations, comprising:
    A. at least one information modeler subsystem (IMS) including Information Model (IM) means for creating, analyzing and modifying an information model, said information model having IM design data;
    B. at least one process modeler subsystem PMS including Information Flow Model (IFM) means for creating, analyzing, and modifying an information flow model, said information flow model having IFM design data representative of elements including at least one from the group consisting of processes, information stores, information flows, messages, views, process local stores, sources, and destinations, said IFM design data relating to at least one of said elements of said IM design data;
    C. at least one logic modeler subsystem (LMS), including Process Description Language (PDL) means for defining logical operations on at least one of said IFM design data and IM design data, aid logical operations being defined by PDL design data;
    D. modeler linking subsystem coupled to said IMS, said PMS, and said LMS, said modelers linking subsystem including means for dynamically correlating said IMS, said PMS, and said LMS, wherein a change to any of said IM design data affects a corresponding IM-IFM/PDL change in said IFM design data and said PDL design data, and wherein a change to any of said IFM design data affects a corresponding IFM-IM/PDL change in said IM design data and said PDL design data, and wherein a change to any one of said PDL design data affects a corresponding PDL-IM/IFM change in said IM design data and said IFM design data;
    E. operator means coupled to said IMS, said PMS, and said LMS for applying external signals to said IMS and said PMS, and said LMS, said signals being effective to evoke a creating, analyzing, or modifying response from at least one of said IM means, said IFM means, and said PDL means; and
    F. filter means coupled to said IMS, said PMS, and said LMS, for creating at least one subset selected from the group of subsets consisting of an IM-subset of said information model, and IFM-subset of said process model, and a PDL-subset of said PDL design data, each of said IM-subset, IFM-subset, and PDL-subset being defined by operator-determined selection criteria, and being selected in accordance with said selection criteria from said IM design data, IFM design data, and PDL design data.

4. A computer system according to claim 3 wherein said IM design data is representative of elements including at least one from the group consisting of: attribute; attribute method; partnership set; partnership set method; entity; entity method; entity and relationship;

entity and attribute, and; entity, relationship, and partnership set.

5. A computer system according to claim 4 wherein said filter means further comprises means for establishing an IM-subset display of said IM-subset having IM-subset display objects representative of said IM-subset, including means associated with said IM-subset display selectively operative for externally applying signals to said IM-subset display objects, whereby an externally applied signal associated with at least one of said IM-subset display objects affects said information model.

6. A computer system according to claim 4 wherein said filter means further comprises means for establishing an IFM-subset display of said IFM-subset having IFM-subset display objects representative of said IFM-subset, including means associated with said IFM-subset display selectively operative for externally applying signals to said IFM-subset display objects, whereby an externally applied signal associated with at least one of said IFM-subset display objects affects said process model.

7. A computer system according to claim 4 wherein said filter means further comprises means for establishing a PDL-subset display of said PDL-subset having PDL-subset display objects representative of said PDL-subset, including means associated with said PDL-subset display selectively operative for externally applying signals to said PDL-subset display objects, whereby an externally applied signal associated with at least one of said PDL-subset display objects affects said PDL design data.

8. A computer system according to claim 4 wherein said filter means further comprises:
   means coupled to said IMS for establishing an IM-subset display of said IM-subset having IM-subset display objects representative of said IM-subset, including means associated with said IM-subset display selectively operative for externally applying signals to said IM-subset display objects, whereby an externally applied signal associated with at least one of said IM-subset display objects affects said information model;
   means coupled to said PMS for establishing an IFM-subset display of said IFM-subset having IFM-subset display objects representative of said IFM-subset, including means associated with said IFM-subset display selectively operative for externally applying signals to said IFM-subset display objects, whereby an externally applied signal associated with at least one of said IFM-subset display objects affects said process model; and
   means coupled to said LMS for establishing a PDL-subset display of said PDL-subset having PDL-subset display objects representative of said PDL-subset, including means associated with said PDL-subset display selectively operative for externally applying signals to said PDL-subset display objects, whereby an externally applied signal associated with at least one of said PDL-subset display objects affects said PDL design data.

9. A computer system according to claim 8 further comprising a display linking subsystem coupled to said IMS, said PMS, and said LMS, said display linking subsystem including means for dynamically correlating said IM-subset display, said IFM-subset display, and said PDL-subset display, wherein a change to any of said IM-subset design data affects a substantially immediate corresponding change in said IFM-subset design data and said PDL-subset design data, and wherein a change to any of said IFM-subset design data affects a substantially immediate corresponding change in said IM-subset design data and said PDL-subset design data, and wherein a change to any of said PDL-subset design data affects a substantially immediate corresponding change in said IM-subset design data and said IFM-subset design data.

10. A computer system according to claim 3 wherein said PDL design data corresponds to at least one from the group consisting of insert, retrieve, update, delete, send, receive, signal, when, reference to an entity method, connect, and disconnect.

11. A computer system according to claim 10 wherein said PDL design data is representative of at least one from the group consisting of text and tree structure diagram, and
   wherein said operator means further include means for selectively displaying said text and tree structure diagrams.

12. A computer system according to claim 11 wherein said text is representative of at least one from the group consisting of icons and alphanumeric symbols.

13. A computer system according to claim 12 wherein said operator means further includes means for externally applying signals to said logic modeler whereby an externally applied signal associated with at least one of said text affects said PDL design data.

14. A computer system according to claim 11 wherein said tree structure diagram includes nodes and pins, and wherein said nodes have text fields including data representative of at least one of logical operations, IM design data, or IFM design data.

15. A computer system according to clam 14 wherein said tree structure diagram includes nodes and pins, wherein said pins are representative of operation locations at said node, whereby an external signal applied to at least one of said operation locations performs an operation at said operation location, said operation including at least one from the group consisting of: add data, replace data, delete data, add node, replace node, or delete node.

16. A computer system according to claim 3 further comprising at least one function modeler subsystem FMS including Function Decomposition (FD) design data representative of FD subprocesses, each of said subprocesses corresponding to at least one of said processes of said IFM design data, and having FD means for defining a hierarchy of said FD subprocesses of said IFM design data.

17. A computer system according to claim 16 wherein said hierarchy is representative of at least one text or graphics, and
   wherein said operator means is coupled to said FMS and further includes means for selectively displaying said text and graphics.

18. A computer system according to claim 16 wherein said modeler linking subsystem further comprises means for dynamically correlating said FMS with said LMS and said PMS, whereby a change to any of said FD design data affects a corresponding FD-PDL/IFM change in said PDL design data and said IFM design data, and whereby a changes to any of said PDL design data or said IFM design data affects a corresponding PDL/IFM-FD change in said FD design data.

19. A computer system according to claim 18 wherein said FMS further comprises means for establishing a FD display having FD display objects representative of said FD design data, including means associated with said FD display selectively operative for externally applying signals to said FD display objects, whereby an externally applied signal associated with at least one of said FD display objects affects said FD design data; and wherein said PMS further comprises means for establishing a IFM display having IFM display objects representative of said IFM design data, including means associated with said IFM display selectively operative for externally applying signals to said IFM display objects, whereby an externally applied signal associated with at least one of said IFM display objects affects said IFM design data.

20. A computer system according to claim 19 further comprising a display linking subsystem coupled to said FMS and said PMS, said display linking subsystem including means for dynamically correlating said FD display and said IFM display, whereby a change to any of said FD design data affects a substantially immediate corresponding change in said IFM design data, and whereby a change to any of said IFM design data affects a substantially immediate change in said FD design data.

* * * * *